United States Patent
Merrell et al.

(10) Patent No.: US 6,553,408 B1
(45) Date of Patent: Apr. 22, 2003

(54) VIRTUAL DEVICE ARCHITECTURE HAVING MEMORY FOR STORING LISTS OF DRIVER MODULES

(75) Inventors: Alan Merrell, Fremont, CA (US); Joseph Altmaier, Riverside, IA (US); Jerry Parker Lane, San Jose, CA (US); Michael G. Panas, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/347,042

(22) Filed: Jul. 2, 1999

Related U.S. Application Data

(63) Continuation-in-part of application No. 09/276,428, filed on Mar. 25, 1999, now Pat. No. 6,446,141.

(51) Int. Cl.[7] .............................................. G06F 15/167
(52) U.S. Cl. ....................................... 709/213; 711/100
(58) Field of Search .......................... 709/213; 711/100, 711/147

(56) References Cited

U.S. PATENT DOCUMENTS

| | | | |
|---|---|---|---|
| 5,471,603 A | | 11/1995 | Yokote et al. ............... 395/402 |
| 5,504,873 A | * | 4/1996 | Martin et al. ............. 369/30.32 |
| 5,581,724 A | | 12/1996 | Belsan et al. ............... 395/441 |
| 5,666,538 A | * | 9/1997 | DeNicola .................... 713/320 |
| 5,737,549 A | * | 4/1998 | Hersch et al. ............... 345/505 |
| 6,148,414 A | * | 11/2000 | Brown et al. ................. 714/11 |
| 6,260,155 B1 | * | 7/2001 | Dellacona ...................... 714/4 |
| 6,327,614 B1 | * | 12/2001 | Asano et al. ................ 709/213 |
| 6,421,711 B1 | * | 7/2002 | Blumenau et al. .......... 709/213 |

FOREIGN PATENT DOCUMENTS

| | | |
|---|---|---|
| WO | WO 99/34297 | 7/1999 |
| WO | WO 00/52576 | 9/2000 |

OTHER PUBLICATIONS

Sun Enterprise Volume Manager 2.5 Admin. Guide—Chapter 1 pp. 1–1 to 1–15 Copyright 1997.

* cited by examiner

Primary Examiner—Krisna Lim
(74) Attorney, Agent, or Firm—Hamilton & Terrile, LLP; Stephen A. Terrile

(57) ABSTRACT

A storage server architecture supporting virtual devices and virtual circuits for storing data is provided. The storage server includes a plurality of communication interfaces. A first set of communication interfaces in the plurality is adapted for connection to all kinds of users of data. A second set of communication interfaces in the plurality is adapted for connection to respective devices in a pool of storage devices. Data processing resources in the server are coupled to the plurality of communication interfaces for transferring data among the interfaces. The data processing resources comprise a plurality of driver modules and configurable logic linking driver modules into data paths. Each configured data path acts as a virtual circuit that includes a set of driver modules selected from the plurality of driver modules. A data storage transaction which is received at a communication interface is mapped to one of the configured data paths.

35 Claims, 12 Drawing Sheets

VIRTUAL DEVICE ARCHITECTURE HAVING MEMORY FOR STORING LISTS OF DRIVER MODULES

RELATED APPLICATION REFERENCE

The present application is a continuation-in-part of prior, co-pending U.S. patent application Ser. No. 09/276,428, entitled Storage Server System, invented by Shari J. Nolan, Jeffrey S. Nespor, George W. Harris Jr., Jerry Parker Lane, and Alan R. Merrell, filed Mar. 25, 1999 now U.S. Pat. No. 6,446,141, and such application is incorporated by reference as if fully set forth herein.

The present application is related to co-pending U.S. patent application Ser. No. 09/346,592, entitled Storage Server With Interface to Emulate Legacy Storage Device, invented by Michael Panas, filed on Jul. 2, 1999, and owned by the same assignee now and at the time of invention.

BACKGROUND OF THE INVENTION

1. Field of the Invention

This invention relates to the field of mass storage systems. In particular, the invention relates to the management of storage transactions in, and the configuration of, intelligent storage area networks.

2. Description of the Related Art

The storage of large amounts of data in so-called mass storage systems is becoming a common practice. Mass storage systems typically include storage devices coupled to file servers on data networks. Users in the network communicate with the file servers for access to the data. The file servers are typically connected to specific storage devices via data channels. The data channels are usually implemented with point-to-point communication protocols designed for managing storage transactions.

As the amount of storage increases, and the number of file servers in communication networks grows, the concept of a storage area network (SAN) has arisen. Storage area networks connect a number of mass storage systems in a communication network which is optimized for storage transactions. For example, fiber channel arbitrated loop FC-AL networks are being implemented as SANs. The SANs support many communication sessions between users of the storage systems and the specific storage systems on the SAN.

File servers and other users of the storage systems are configured to communicate with specific storage media. As the storage systems expand or media is replaced in the system, re-configuration is required at the file servers and other users. Also, if a need arises to move the data from one device to another, in a so-called data migration operation, it is often necessary to block access to the data during the migration process. After migration is complete, re-configuration at the user system must be executed to make the data available from the new device.

Overall, as the complexity and size of storage systems and networks increase, the problems of managing configuration of the users of the data and of the storage systems themselves multiply. Accordingly, there is a need for systems that simplify management of storage systems, while taking advantage of the flexibility and power of the SAN architecture.

SUMMARY OF THE INVENTION

The present invention provides a storage server architecture supporting virtual devices and virtual circuits for storing and managing data. The storage server according to the present invention includes a plurality of communication interfaces. A first set of communication interfaces in the plurality is adapted for connection to all kinds of users of data. A second set of communication interfaces in the plurality is adapted for connection to respective devices in a pool of storage devices. Data processing resources in the storage server are coupled to the plurality of communication interfaces for transferring data among the interfaces. The data processing resources comprise a plurality of driver modules and configurable logic linking driver modules into data paths, which are implemented in pairs for redundancy in a preferred system. Each configured data path acts as a virtual circuit that includes a set of driver modules selected from the plurality of driver modules. A data storage transaction which is received at a communication interface is mapped to one of the configured data paths.

According to another aspect of the invention, the plurality of driver modules includes a protocol server for a protocol supported on a communication interface in the plurality of communication interfaces. The protocol server recognizes target identifiers which identify particular storage extents according to the protocol on the interface. Transactions addressed to the particular storage extent are mapped to a particular configured data path in the server.

The data paths configured in this manner act as virtual storage devices. Users of the data communicate with a communication interface on the storage server according to a protocol for a particular storage device. Inside the server, the transactions according to that protocol are mapped to a virtual storage device implemented by sets of drivers. Setting up and changing the storage tasks performed in a particular data path, and setting up and changing the mapping of a storage extent from one data path to another are accomplished by configuring the sets of driver modules within the storage server.

According to an aspect of the invention, the plurality of driver modules includes one or more hardware driver modules that manage respective communication interfaces, and one or more internal driver modules that perform data path tasks independently of the plurality of communication interfaces. The data path tasks include, for example, cache memory management, memory mirroring management, memory partition management, data migration management, and other tasks for managing storage transactions. By providing data path tasks of this type in a virtual device architecture, the configuration of the storage system to manage such tasks is essentially transparent to the users. In addition, providing the virtual device capability at a storage server optimized to perform such tasks allows for improved performance and greater flexibility.

Also, according to an aspect of the invention, the plurality of driver modules includes logic for communicating data within the server environment according to an internal message format. Incoming storage transactions are translated into the internal message format, and placed in the configured data path for the particular transaction. In one preferred embodiment, the protocol server performs the protocol translation and virtual circuit mapping function.

The configurable logic includes a user interface for accepting configuration data and a memory that stores tables or lists of the respective sets of driver modules that comprise the data paths. The configurable logic in one embodiment is implemented using a graphical user interface, for example on a display including a touch screen for accepting input signals. The graphical user interface allows for implementation of configuration tools that are flexible and easy to use.

According to another aspect of the invention, the configuration logic includes memory for storing configuration data in the form of tables that identify the data paths for virtual circuits. The memory in one embodiment is implemented using a persistent tables storage process which maintains the tables in a non-volatile memory that survives a reset and/or power down of the storage system. In addition, the configuration logic implements the data paths for the virtual circuits using redundant driver modules on redundant hardware in the system. Thus, no single point of failure on the storage system will interfere with a particular storage transaction.

The communication protocols supported on the interfaces adapted for communication with users of the data in various embodiments include fiber channel FC protocols such as the Fiber Channel Arbitrated Loop (FC-AL), and the Fiber Channel—Small Computer System Interface (SCSI) based protocol known as FCP. Other protocols include such protocols as the Internet Protocol (IP), the High Performance Parallel Interface (HIPPI), the Intelligent Peripheral Interface (IPI) and other protocols combined with or in place of these examples. According to each of these protocols, storage transactions can be executed which identify particular target storage extents, such as using the SCSI target ID and a Logical Unit Number (LUN). Thus, in this example, a storage transaction which identifies a SCSI target ID and a LUN, can be mapped in response to the target ID and the LUN to a particular virtual circuit in the storage server.

Internal protocols for communicate on among the plurality of drivers include a variety of block transfer protocols, such as formats similar to the standard I2O block storage architecture (BSA) format.

The present invention provides an intelligent storage routing device which manages logical and physical access to a pool of shared storage devices. The device is logically closer to the client server than to the storage devices, and responds to client specific requests for storage transactions which require accessing and sharing a storage area network coupled to the device. The device manages the use of a cache memory to enhance performance. Key functions provided at the device include authentication and access permission logic, virtual circuit mapping, storage mirror functions, and a large non-volatile cache. With these basic functions, many powerful storage management applications can be implemented with existing servers and storage devices, which facilitates the addition of new storage to networks.

DETAILED DESCRIPTION

Overview

Figure 1:
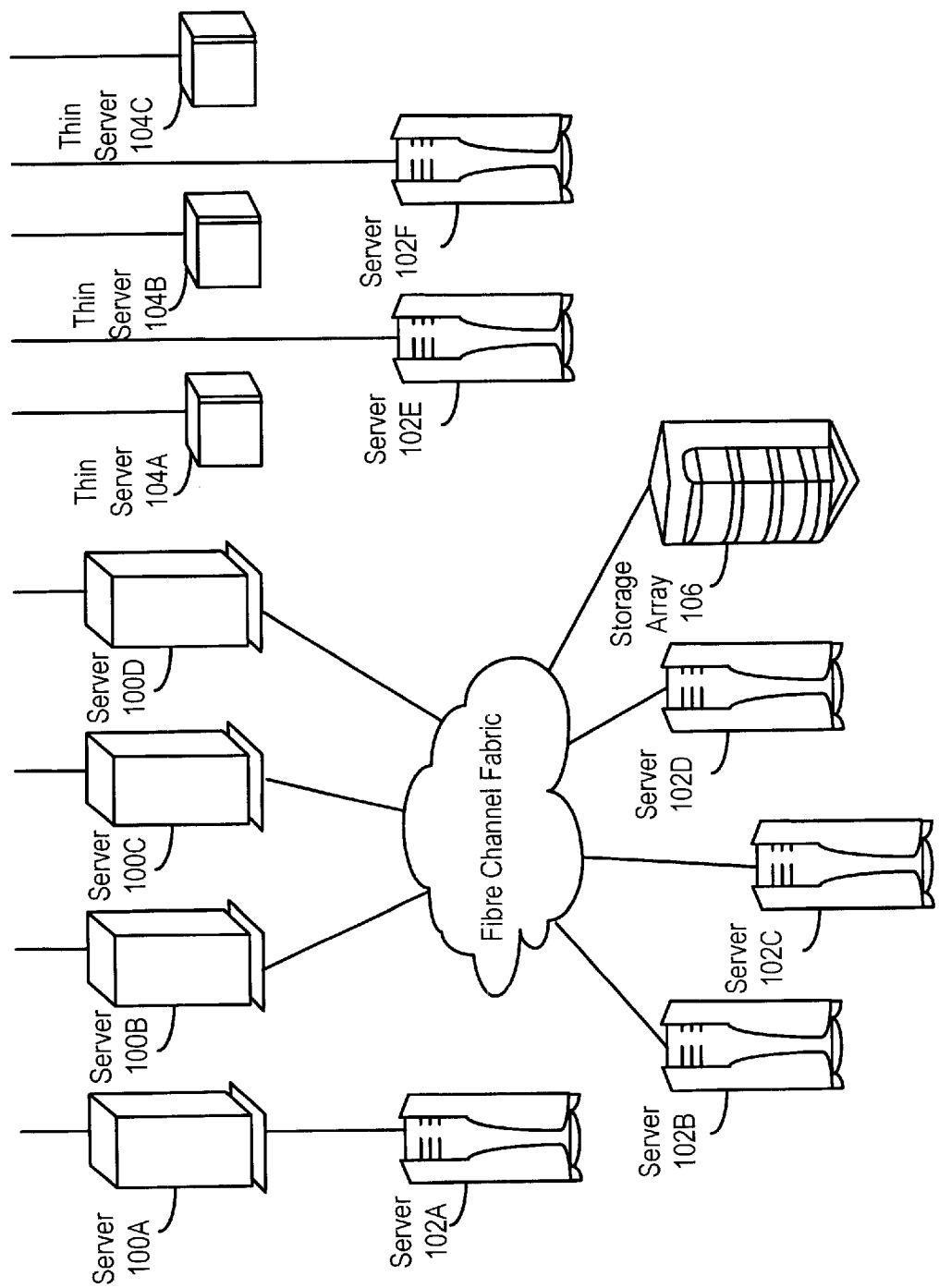
FIG. 1 illustrates a variety of uses for intelligent storage area network servers.

FIG. 1 illustrates a variety of uses for intelligent storage area network (ISAN) servers. A storage area network (SAN) can be used to provide data storage services for client computers. A storage area network is optimized to provide high bandwidth and high throughput storage for client computers such as file servers, web servers and end user computers. An ISAN server, according to the present invention, provides additional functionality beyond data storage and retrieval such as storage routing and virtual device management.

FIG. 1 includes the servers 100A–D, the ISAN servers 102A–F, the thin servers 104A–C, and a storage array 106. The servers 100A–D can be UNIX servers, Windows™ NT servers, NetWare™ servers or some other type of file server.

The servers 100A–D are coupled to client computers by network links. The ISAN server 102A is coupled to the server 100A by a network link. The ISAN server 102A provides data storage services to the server 100A by performing the requested storage transactions. The ISAN server 102A is treated like a storage device by the server 100A. The ISAN server 102A is capable of holding more storage than a typical hard disk drive or hard drive array. The ISAN server 102A can be used as a storage router and provide intelligent routing among data stores coupled to the ISAN server 102A.

The ISAN server 102A also provides higher bandwidth and higher throughput processing of storage transactions than a typical hard disk drive or hard drive array. The ISAN server 102A can therefore handle the volume of demands created by multimedia data streams and other large volume data streams.

To provide the highest throughput, the ISAN server 102A may be coupled to the server 100A by a high speed network media such as a fibre channel. The servers 100B–D are coupled to client computers by network links. The servers 100B–D are coupled to a storage area network by a fibre channel fabric. The storage area network includes the ISAN servers 102B–D and the storage array 106. The servers 100B–D and the ISAN servers 102B–D support drivers for a fibre channel arbitrated loop (FC-AL).

Communication between the servers 100B–D and the storage devices over the FC-AL can be accomplished using a protocol compliant with the standard small computer system interface version 3 (SCSI-3) preferably using a fiber channel medium, also termed fibre channel protocol (FCP) (e.g., SCSI-X3T10 and FCP X3.269-199X). In other embodiments, protocols such as the Internet Protocol are used over the fibre channel fabric 108 carrying storage transactions in a variety of protocols. In some embodiments, the ISAN server 102A supports multiple protocols.

The thin servers 104A–C are coupled to clients by network links, but in this example, they are not using storage area networks to provide data storage.

The ISAN servers 102E–F are directly coupled to clients by network links. There is no intermediate server. The ISAN servers 102E–F may provide application specific processors (ASPs) that provide functionality such as file servers, web servers, and other types of processing.

An Intelligent Storage Area Network Server

Figure 2:
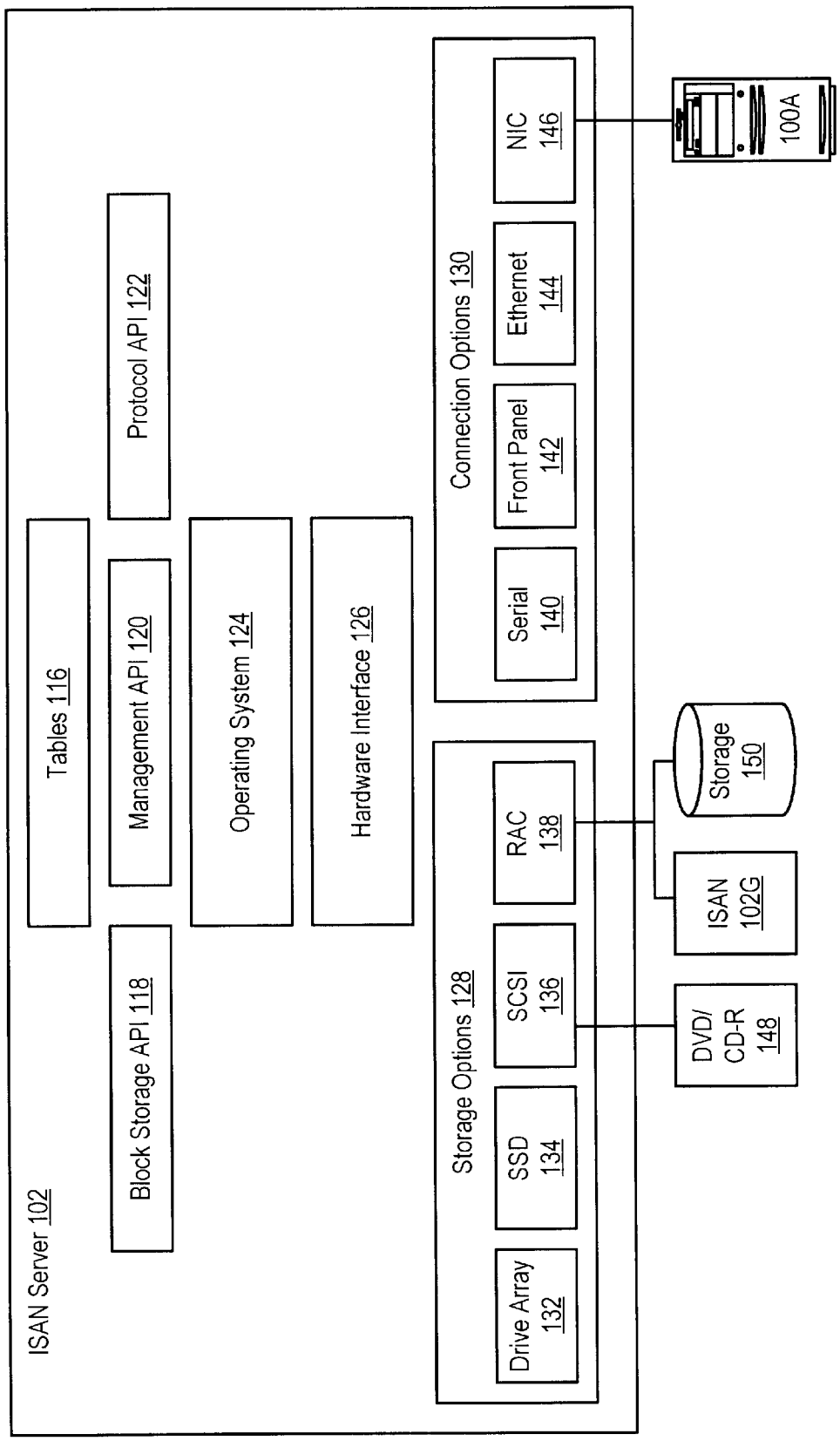
FIG. 2 is a block diagram of an intelligent storage area network server.

FIG. 2 is a block diagram of an ISAN server in one preferred embodiment, such as the ISAN server 102A, or some other ISAN server.

The ISAN server 102A has connection options 130 including a set of communication interfaces adapted for users and for other data processing functions, and storage options 128 including a set of communication interfaces adapted for storage devices. The ISAN server 102A has a hardware interface 126, an operating system 124, a block storage interface 118, a management interface 120, and a protocol interface 122. The connection options 130 include serial connections 140, a front panel connection 142, an Ethernet connection 144, and a network interface 146. The storage options 128 includes the drive array 132, the solid state drive (SSD) 134, the SCSI interface 136, and the network interface 138. The SCSI interface 136 is coupled to a DVD/CD-R 148. The network interface 138 is coupled to an ISAN server 102G and/or storage 150.

The connection options 130 are various methods of connecting servers and clients to the ISAN server 102A. The serial connections 140 support network management, modems for remote management, and uninterruptible power supply messages. The front panel connection 142 supports a management connection with the front panel display of the ISAN server 102A. The Ethernet connection 144 supports an Ethernet interface for management protocols and possibly for data transfer. The network interface 146 is one of potentially many high speed interfaces on the server. In some embodiments, the network interface 146 is a fibre channel interface with drivers for a fibre channel arbitrated loop (FC-AL). The network interface 146 may also include drivers for SCSI-3 over the fibre channel medium using fibre channel protocol (FCP).

The hardware interface 126 provides interface specific hardware components. For example, the network interface 146 has a network interface specific set of software modules to support configuration, diagnostics, performance monitoring, and health and status monitoring.

The operating system 124, the tables 116, and the interfaces 118–122 support the virtual device and storage routing functionality of the ISAN server 102A. These components of the ISAN server 102A route storage transactions among appropriate storage options 128 and the connection options 130 using configured sets of driver modules in the system.

The operating system 124 provides message routing and transport facilities in addition to fail-safe facilities. The message routing and transport facilities of the operating system 124 are used to route messages, including storage transactions, between the components of the ISAN Server 102B. These messages include message in the internal format between components of a virtual circuit. These messages can also include control messages in other formats.

The block storage interface 118 provides software modules to support block data transfers. The interface 118 includes support for striped data storage, mirrored data storage, partitioned data storage, memory cache storage, and RAID storage. The different supported storage types can be linked to form various combinations such as a mirrored data storage with a memory cache.

The protocol interface 122 provides software modules for translating and responding to requests in a variety of protocols. One set of modules is provided for the layers of an Ethernet connection: the hardware driver, the data link driver, the Internet protocol (IP) driver, the transmission control protocol (TCP) driver, the user datagram protocol (UDP) driver, and other drivers. Another set of modules provides drivers for FCP.

The management interface 120 provides software modules for managing the ISAN server 102A. The management interface 120 contains interfaces for managing access to the tables 116. The management interface 120 also contains interfaces for rules based management of the system including: scheduling, or process orchestration; monitoring the system; informed consent management; and handling system processes and events. The informed consent management module is premised on providing rules based management suggestions for configuring and maintaining the ISAN server 102A.

Handling Storage Transactions

Storage transactions are received over one of the connection options 130. Storage transactions include read and write requests as well as status inquiries. The requests may be block oriented.

A typical read storage transaction is comprised of the read command and addressing information. A write storage transaction is similar to the read storage transaction except the request includes information about the amount of data to be sent and is followed by the data to be written. More specifically, using the SCSI-3 protocol, each device has an identifier (ID). The machine issuing the request is called the initiator and the machine responding to the request is called the target. In this example, the server 100A is the initiator and has ID 7. In this example, the ISAN server 102A is the target and has ID 6. The SCSI-3 protocol provides for two or more addressing components, a logical unit number (LUN) and an address.

The LUN specifies a subcomponent of the target ID. For example, in a combined hard disk/tape drive enclosure, the two devices might share an ID, but have different LUNs. The third addressing component is the address where the device data is to be read from or stored to. The ISAN server 102A provides for virtual LUNs on a per initiator basis. Thus a single ISAN server 102A might support, for example, ten thousand virtual LUNs or more.

The ISAN server 102A will map the SCSI-3 storage transaction request to a virtual circuit corresponding to a virtual LUN. A virtual circuit is a sequence of one or more virtual devices. A virtual device is a composed of one or more devices such as software modules or hardware components. For example, two network interface devices could be combined to be a virtual device. Similarly, two cache devices could be combined as a virtual device. This design permits components to fail without disrupting the storage transaction processing capabilities of the ISAN server 102A.

A virtual circuit comprises the necessary virtual devices to support a storage transaction. Typically, the first component in the virtual circuit is a driver for translation of the storage transaction from the storage transaction communication channel format, FCP in this example, to an internal format. One such internal format may be similar to the intelligent input and output ($I_2O$) block storage architecture (BSA) message format. The internal format is storage medium and communication channel neutral in the preferred system.

The intermediate virtual devices of a virtual circuit provide additional services such as caching, mirroring, RAID, etc. Because the internal format is storage medium neutral, all of the intermediate virtual devices can be designed to operate on the internal format and thus interoperate with other virtual devices in the circuit.

The final virtual device in a virtual circuit is typically the format translation and communication channel drivers for controlling the storage. For example, the drive array 132 is controlled by redundant hardware driver modules (HDMs) that are grouped to form a virtual device. The HDMs provide BSA to SCSI translation and the HDM handles the interface to the drives that compose the drive array 132. Similarly, if the virtual circuit is a link to some other type of storage over the network interface 138, there will be a virtual device with support for BSA translation to the storage device communication channel protocol.

The storage server also includes resources in the operating system and at the interfaces to the client servers which emulate physical storage devices. The emulation allows the virtual devices to appear to the client servers accessing the storage as if they were physical devices. Thus, the client servers can be configured to communicate using standard protocols, such as FCP using SCSI commands for storage transactions. In the embodiment utilizing SCSI commands, the emulation involves responding to an inquiry command according to the SCSI protocol with device identifiers and device capability information expected by, or compatible with, the initiating server. Also, a read capacity command and a mode page data command in the SCSI protocol are handled by the emulation resources in a manner that allows the client servers using the storage to rely on standard configuration information for physical storage devices, while the storage server spoofs the client server by emulating the physical storage devices at the interface with the client server, and maps actual storage transactions to virtual devices. The emulation resources also allow the virtual devices to be identified by the combination of an initiator, a logical unit number LUN, and a target device identifier, without requiring the storage transaction to be tied to the specific physical target device identified in the request.

Storage Routing

The ISAN server 102B supports storage routing. For example, if the server 100A is originally coupled to the storage 150 in a SAN, the ISAN server 102B can be added to the SAN between the server 100A and the storage 150 to provide new functionality and easier administration by supporting storage routing.

In the original configuration, the server 100A provides data backup and archiving functionality. The backup and archiving functions tie up the processor of the server 100A with important but bandwidth intensive functions. In the configuration of FIG. 2, the ISAN server 102A acts as a storage router for storage transactions requested by the server 100A. The ISAN server 102A can then direct backups and archiving without tying up the server.

The ISAN server 102A provides another advantage in adding a larger storage device. For example, if storage 150 is a terabyte drive array and a new drive array that supports sixteen terabytes of storage is being brought onto the network, the ISAN server 102A can migrate the data to the new array without consuming processor time on the server 100A. Further, the mirroring drivers support intelligent read and write functionality that allow the storage 150 to be shifted to the new drive array without disrupting access to the data.

Thus, as data is moved to the new storage array, read and write requests for those portions of the data will be directed to the new array while requests for other data portions will be directed to the old storage 150. Once the migration is complete, the virtual circuit can be adjusted to remove the storage 150 from the virtual circuit.

The ISAN server 102A, in one embodiment, provides a platform for cache memory which is shared among a plurality of virtual circuits.

Because a storage transaction is not linked to a data store, it is possible to change the data stores supporting a virtual circuit as storage needs change or as different storage equipment is used.

Hardware Architecture Overview

Figure 3:
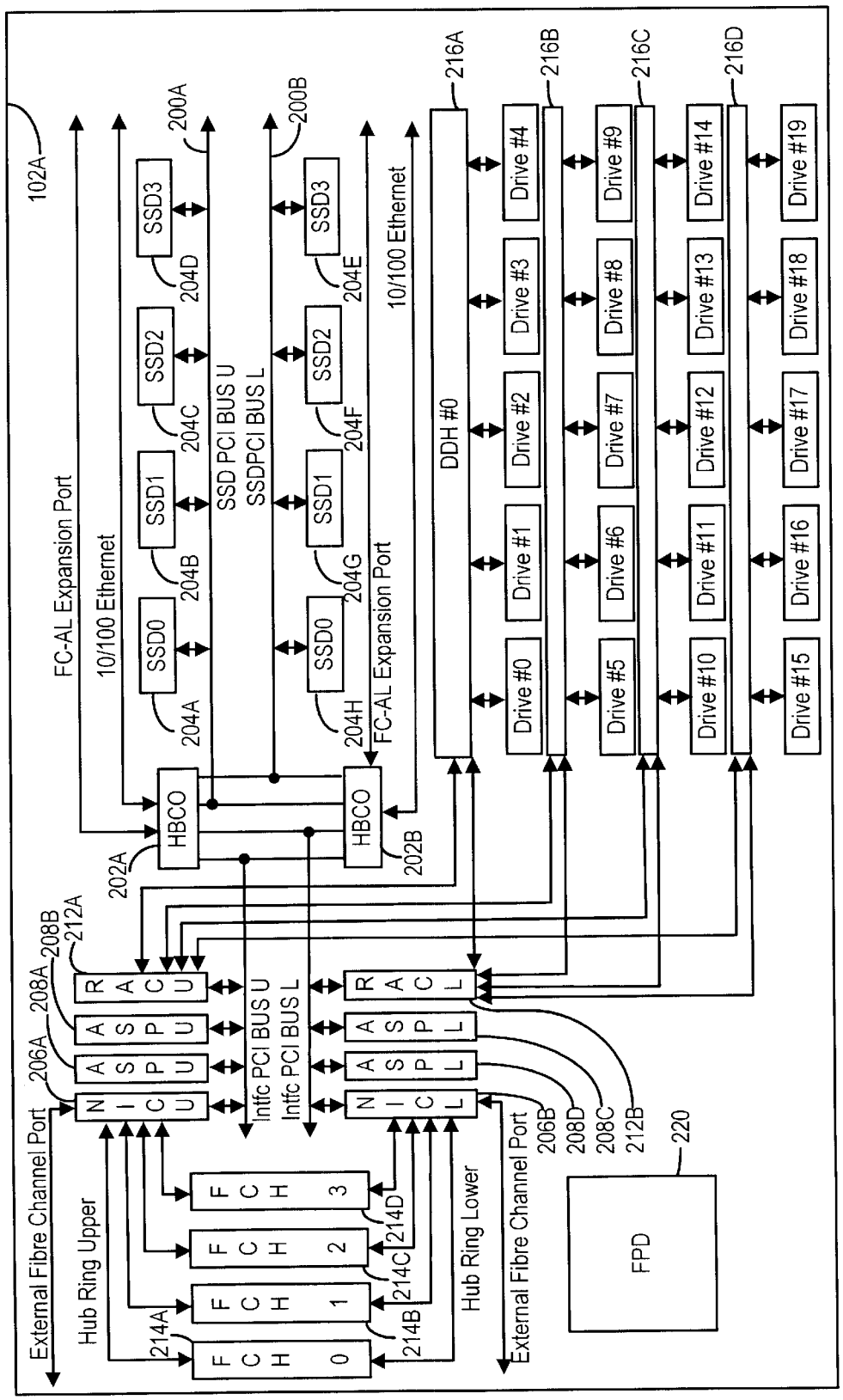
FIG. 3 is a block diagram of the hardware architecture of an intelligent storage area network server.

FIG. 3 is a block diagram of one suitable hardware architecture of an intelligent storage area network (ISAN) server. The hardware architecture implements redundancy and supports distributed software systems to prevent any one single point of failure from interfering with a particular storage transaction.

FIG. 3 includes the ISAN server 102A. The ISAN server is designed to provide a high degree of redundancy while using standard components and the standard based devices. For example, the ISAN server 102A uses a high speed version of the standard peripheral component interconnect (PCI) implementation and standard fibre channel arbitrated loop (FC-AL) interfaces. A variety of other protocols and interfaces can be used in other embodiments.

The ISAN server 102A has four separate 64-bit 66 MHz PCI busses 200A–D. Many different configurations of storage devices and network interfaces in the slots of the PCI busses are possible. In one embodiment, the PCI busses are divided into two groups: the SSD PCI busses 200A–B and the interface PCI busses 200C–D. Each group has two busses that are designated by the terms upper and lower. The upper and lower busses in each group can be configured to provide redundant services. For example, the lower SSD PCI bus 200B has the same configuration as the upper SSD PCI bus 200A.

The PCI busses 200A–D are connected to host bridge controller (HBC) modules 202A–B. The HBC modules 202A–B span the PCI busses 200A–D and provide redundant bridging paths.

The SSD PCI busses 200A–B support solid state drive (SSD) modules 204A–G. The SSD modules 204A–G provide solid state storage devices such as a flash memory store.

The interface PCI busses provide an interconnection from the network interface controller (NIC) modules 206A–B, the redundant arrays of independent disks (RAID) Controller (RAC) modules 212A–B, and application specific processing (ASP) modules 208A–D to the HBC modules 202A–B.

In addition to coupling the ISAN server 102A to the external FC-AL, the NICs 206A–B can be coupled to fibre channel hub (FCH) modules 214A–D. Each FCH module 214A–D is coupled to both NIC modules 206A–B. Each FCH module 214A–D provides ten FC-AL ports, and can be cascaded through the NIC modules 206A–B to provide a twenty station FC-AL hub.

The disk drive hub (DDH) modules 216A–D provide a redundant FC-AL fabric to connect disk drives to the RAC modules 212A–B. The FC-AL fabric in each of the DDH modules 216A–D comprises two redundant loops, which couple all of the drives attached to the DDH module with both RAC modules 212A–B. The RAC modules manage a loop among all of the DDH modules 216A–D. The DDH modules 216A–D each support five dual-ported disk drives such as the disk drive 218.

The system mid-plane (SMP) is not depicted in FIG. 3. The SMP is a passive mid-plane that provides the interconnections shown in FIG. 3 between the HBC module 202A–B, the SSD modules 204A–H, the RAC modules 212A–B, the NIC modules 206A–B, the FCH modules 214A–D, the DDH modules 216A–D, and the ASP modules 208A–D. The SMP is compact PCI based, with four custom compact PCI busses 200A–D, RAC-DDH interconnections, and NIC-FCH interconnections and miscellaneous control busses comprising the mid-plane signals. In addition, the SMP provides power distribution from the power subsystem, not depicted in FIG. 3, to the modules, at voltages of 48V, 12V, 5V, and 3.3V.

The front panel display (FPD) 220 provides a user interface for the ISAN server 102A. The FPD contains a display device and an input device. In one embodiment, a touch sensitive liquid crystal display (LCD) is used to present a touch sensitive screen with input capabilities. The FPD 220 is coupled to the HBC modules 202A–B to support status displays, configuration display and management, and other management functions.

Power and fan subsystems, not depicted in FIG. 3, provide redundant AC to DC power supplies, redundant DC to DC power conversion, battery backup for power down, and a redundant push-pull fan subsystem. These components support the high availability and low down time features that are important when a storage area network is deployed.

The ISAN server 102A can be coupled to other ISAN servers to appear as a single network port in a storage area network or as a network attached storage device. This coupling can be done over the FC-AL expansion ports that are coupled to each of the HBC modules 202A–B. Additionally, the HBC modules 202A–B offer RS232 serial ports and 10/100 Ethernet ports for out-of-band management.

The bus system includes all of the buses in the ISAN server 102A. In this example, the bus system includes the four PCI buses interconnected by the host bridge controllers. The bus system also includes the PCI buses internal to the HBC modules that provide additional interfaces. The slots include all of the positions on the bus system which can receive interfaces. In this example, each of the four PCI buses outside of the HBC modules can accommodate four interfaces.

The interfaces are the cards or other devices that are placed in the slots. The interfaces support drivers and hardware for the data stores coupled to the interfaces.

Redundancy and Fail-Over

The ISAN server 102A offers a high degree of redundancy. In one embodiment, there are redundant NIC, RAC, and HBC modules. The SSD modules and drives support mirroring. The drives also support parity and dual channel access. Each DDH module contains a fully redundant FC-AL fabric for connection to the RAC modules. Fail-over is handled by the HBC modules, which control the other modules in the ISAN server. The control is multi-layered.

The HBC module's first layer of control-over is the power supply control. Each module has an individual power supply enable signal that is controlled by the CMB controller on the module. Although the HBC modules are redundant, only one HBC module will serve as the master HBC module and direct and control the system. The other HBC will act as a slave. When a module is plugged into a slot, its power supply is initially disabled. Only the master HBC module can enable the power supply. If a module begins to perform improperly and does not respond to commands, the HBC module can disable the power supply to the module.

The second layer of control for the HBC modules is the card management bus (CMB). Each module has an Atmel AT90S8515 (AVR) microcontroller that is coupled to the CMB. The HBC module itself has an AVR microcontroller 316 coupled to the CMB that can act as a master or as a slave. The CMB microcontroller is powered by a connection to the midplane independently of power supplied to the main processor on the module. The CMB allows the master HBC to read a card type, determine if a card is present, send a non-maskable interrupt to a card or perform a hard reset of a card. Module processors and the master HBC module can also perform communication through a serial port on the AVR microcontroller on the module. This communication path can be used as a backup for control communication in the event of a PCI failure.

The third level of control for the HBC modules is the PCI bus. If a module does not respond using a control process on the PCI bus, it can be queried via the CMB. If the module still does not respond, a non-maskable interrupt can be set via the CMB. If the module still does not respond, it can be reset via the CMB. If after reset, the module still does not respond, it can be powered down and a warning can be issued to replace the module.

Software Architecture Overview

An ISAN server is supported by an operating system that is designed to support the uniquely high bandwidth, high throughput, and demands of a storage server. The operating systems schedules and controls data transfers over the bus systems and manages the system. Although a number of different operating system and software component structures are possible, in one embodiment, a highly modular operating system designed for a storage server is used.

Figure 4:
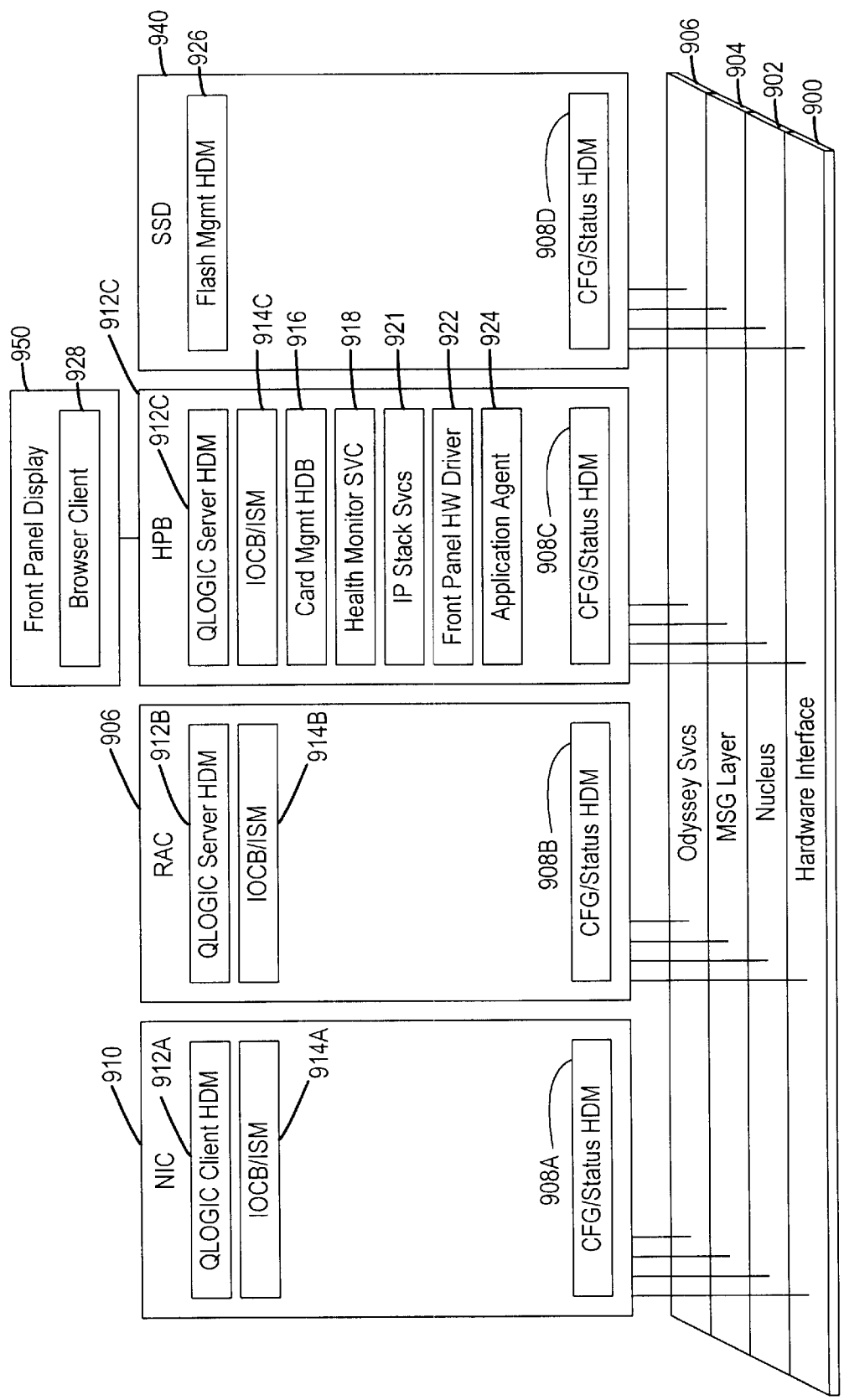
FIG. 4 is a block diagram of the software modules of an operating system and supporting programs for an intelligent storage area network server.

FIG. 4 is a block diagram of the software modules of an operating system and supporting programs for an ISAN server.

FIG. 4 includes the following operating system components: the hardware interface module 900, the Nucleus PLUS™ real-time kernel module 902 available from Accelerated Technologies, Inc., Mobile, Ala., the ISOS protocol management module 904, and the storage services module 906. The hardware interface module 900 allows the software components of the ISAN server to communicate with the hardware components of the ISAN server.

The Nucleus PLUS™ real-time kernel module 902 is used to provide basic operating system functions such as: tasks, queues, semaphores, timers, and critical section support. The Nucleus PLUS™ real-time kernel module 902 is exported to the software modules of the ISAN server as functions in C++ classes by the storage services module 906.

The ISOS module 904 permits the ISAN server to support a messaging architecture for input and output. The hardware modules such as the RAID controller (RAC) modules, the network interface controller (NIC) modules, the solid state drive (SSD) modules, the disk drive hub (DDH) modules, and the fibre channel hub (FCH) modules, are all input/output processors (IOPs). The master host bridge processor (HBC) module serves as the host.

The storage services module 906 implements messaging classes to support the reliable transport of messages between components. The storage services module 906 supports the operation of device driver modules and support for virtual devices. The device driver modules (DDMs) and virtual devices (VDs) are the building blocks of the ISAN server storage system. The storage services module 906 is organized around providing support for requests for storage transactions.

In some applications, a single ISAN server such as the ISAN server 102A will have several hundred DDMs operating in conjunction with the operating system modules 900–906 to support responses to storage server requests. Other applications use a few DDMs in various combinations.

Software components are implemented as device driver modules (DDMs). A DDM that primarily services requests for a hardware device is termed a hardware driver module (HDM). A DDM that serves as an internal, intermediate program is termed an intermediate service module (ISM). For example, the DDMs that service the SSD modules are termed HDMs. The DDMs that provide cache services, mirroring services, and other types of services not directly linked to a hardware device could be termed ISMs.

A single DDM can have multiple instantiations on a single ISAN server. For example, in FIG. 4, there are four instantiations of the performance, health and status PHS monitor 908A–D, one for each of the four major software subsystems: the NIC 910, the RAC 920, the HBC 930, and the SSD 940. Each DDM has its own message queue and a unique identifier. For example, the PHS monitor 908A on the NIC 910 might be device id (DID) 0. Each DDM also lists the class of storage requests handled by the DDM and the operating system modules route the requests to the DDMs based on the class of the storage request. Requests can be routed by request codes or by virtual device numbers.

The NIC software subsystem 910 includes three DDMs: a processor support HDM 912A, an input/output translation ISM 914A and the PHS monitor 908A. The RAC software subsystem 920 includes three DDMs: a processor support HDM 912B, an input/output translation ISM 914B, and a PHS monitor 908B. The HBC software subsystem 930 includes: a processor support HDM 912C, an input/output translation ISM 914C, a card management HDM 916, a system monitor DDM 918, an Internet Protocol DDM 921, a front panel display DDM 922, an application specific processor support DDM 924, and a PHS monitor 908C. The SSD software subsystem 926 includes a solid state drive management HDM 926 and a PHS monitor 908D. The front panel display 950 supports a hypertext markup language (HTML) client 928.

Figure 5:
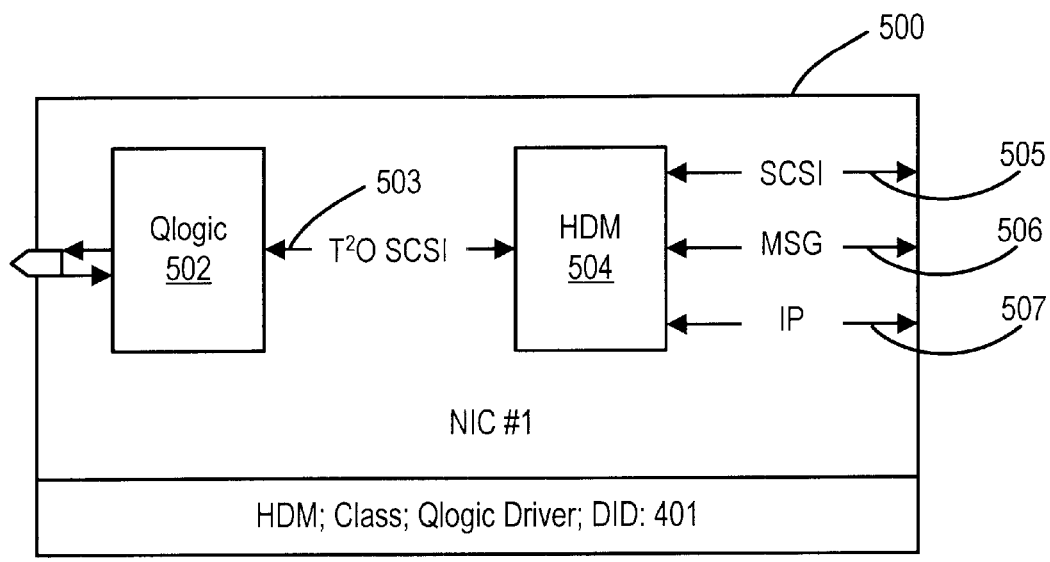
FIG. 5 is a simplified diagram of a hardware driver module for a fiber channel interface for use in the system of the present invention.
Figure 6:
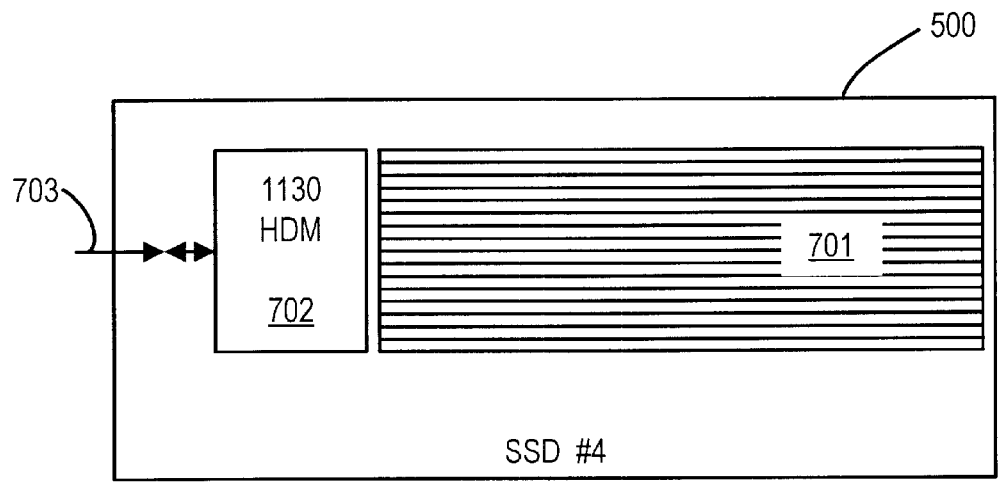
FIG. 6 is a simplified diagram of a solid state storage system including a hardware driver module of the present invention.
Figure 7:
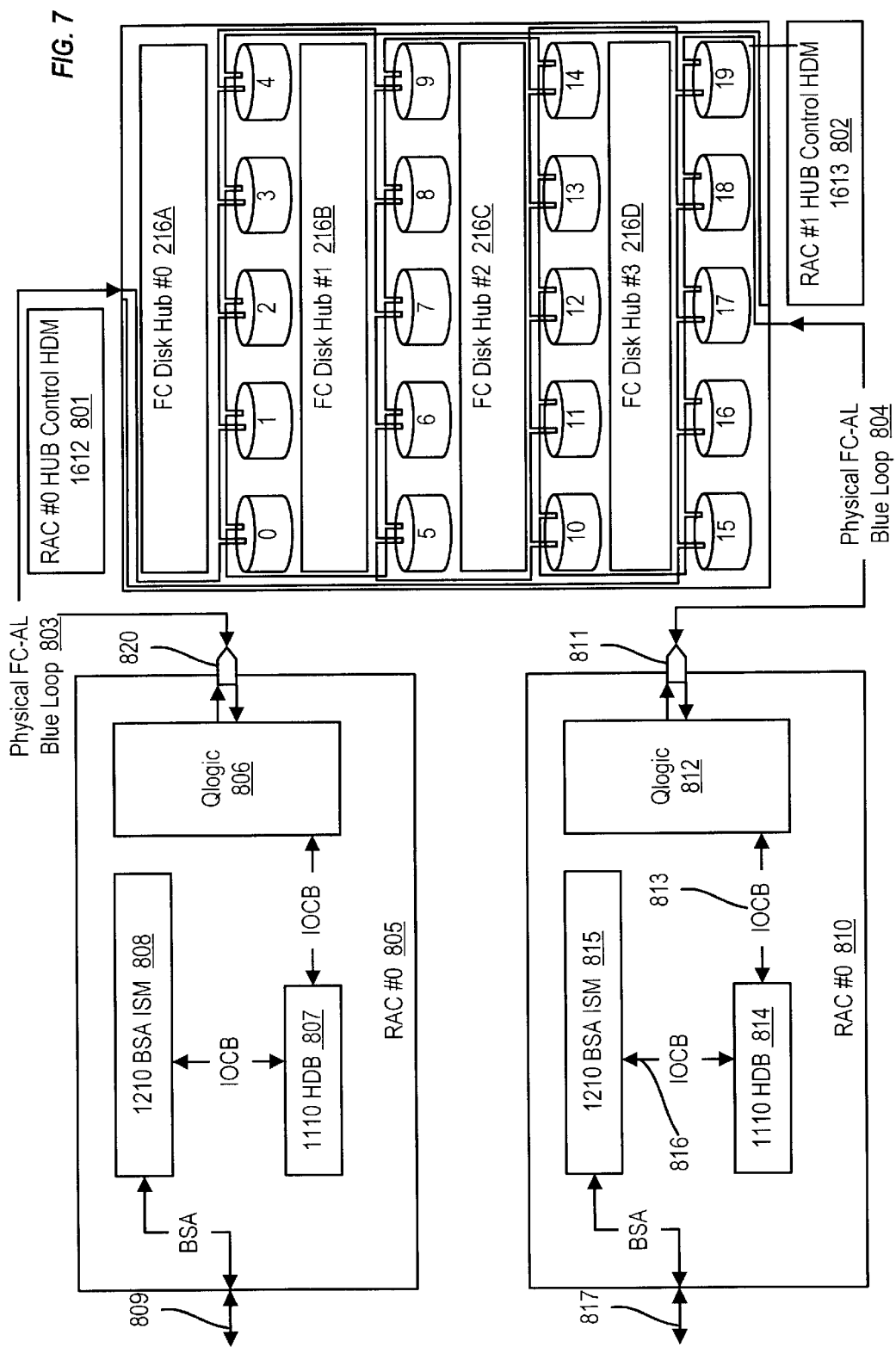
FIG. 7 is a diagram of an internal array of disk drives mounted in one embodiment of a storage server according to the present invention.

FIGS. 5–7 illustrate a variety of hardware driver modules HDMs and FIGS. 8–11 illustrate a variety of internal, intermediate service modules ISMs according to the preferred architecture of the present invention. FIG. 12 provides a simplified diagram of a set of driver modules which have been configured into data paths acting as virtual circuits.

FIG. 5 illustrates a network interface card 500 having a HDM 504. The card 500 has a physical interface 501 to a fiber channel network. A network interface chip 502, in this example a Qlogic device, such as a ISP 2200A provided by Qlogic Corporation of Costa Mesa, Calif., is coupled to the physical interface 501. The network interface chip 502 generates communication represented by line 503, which is processed in the HDM 504. The HDM 504 conditions the communications for use by other driver modules in the system. Thus, communication represented by line 505 has an SCSI format. Communication represented by line 506 has an message format such as a BSA format. Communication represented by line 507 has an Internet Protocol (IP) format. The HDM is an instance of a driver class labeled "QLogic driver" in the diagram, and given device identifier DID 401 in this example. The physical interface is identified as NIC #1.

FIG. 6 illustrates a storage device 700 which is implemented by an array of nonvolatile integrated circuit memory devices. The preferred embodiment of the device 700 is described in co-pending U.S. patent application Ser. No. 09/292,536, entitled *High Speed Bus Interface for Non-Volatile Integrated Circuit memory Supporting Continuous Transfer*, filed Apr. 15, 1999, which is owned by the same assignee as the present application, and is incorporated by reference as if fully set forth herein. The HDM 702 is coupled with the array 701, and translates the block storage architecture communications on line 703 into format for storage and retrieval from the array 701. In this example, the HDM 702 is given a device identifier 1130. The physical interface is identified as SSD #4.

FIG. 7 illustrates the configuration of an array 800 of disk drives which are mounted on the storage server chassis in a fiber channel arbitrated loop architecture in the preferred embodiment shown in FIG. 3. Fiber channel disk hub #0 216A, channel disk hub #1 216B, fiber channel disk of #2 216C, and fiber channel disk hub #3 216D, which are also illustrated in FIG. 3, are coupled to redundant hub control HDMs 801 and 802.

HDMs 801 and 802 are connected with physical fiber channel arbitrated loop connections 803 and 804 respectively. The HDM 801 is given device identifier 1612 and the HDM 802 is given device identifier 1613. The connection 803 is coupled to a fiber channel interface 805. Interface 805 includes a network interface chip 806 which is coupled with physical interface 820, and to a HDM 807. An ISM 808 is coupled to the HDM 807 and to the internal communication path 809. The ISM 808 translates the block storage architecture communications on line 809 into IOCB communications for the HDM 807. The HDM 807 communicates with the network interface chip 806, which in turn drives the fiber channel 803. The ISM 808 is given device identifier 1210, and the HDM 807 is given device identifier 1110. The physical interface 805 is labeled RAC #0.

The fiber channel connection 804 is coupled to interface 810. Interface 810 has a configuration like interface 805. Thus the interface 810 includes a physical fiber channel interface 811 which is driven by network interface chip 812. The network interface chip 812 communicates on the channel represented by line 813 with HDM 814. HDM 814 communicates with ISM 815 via channel 816. The ISM 815 manages an interface to the BSA format messages on channel 817. In this example, the ISM 815 is given device identifier 1211. The HDM 814 is given device identifier 1111. The interface 810 is identified as RAC #1.

FIGS. 5–7 illustrate a variety of physical communication interfaces and corresponding HDMs. FIGS. 8–11 illustrate a variety of ISM examples according to the present invention, which can be configured into data paths.

Figure 8:
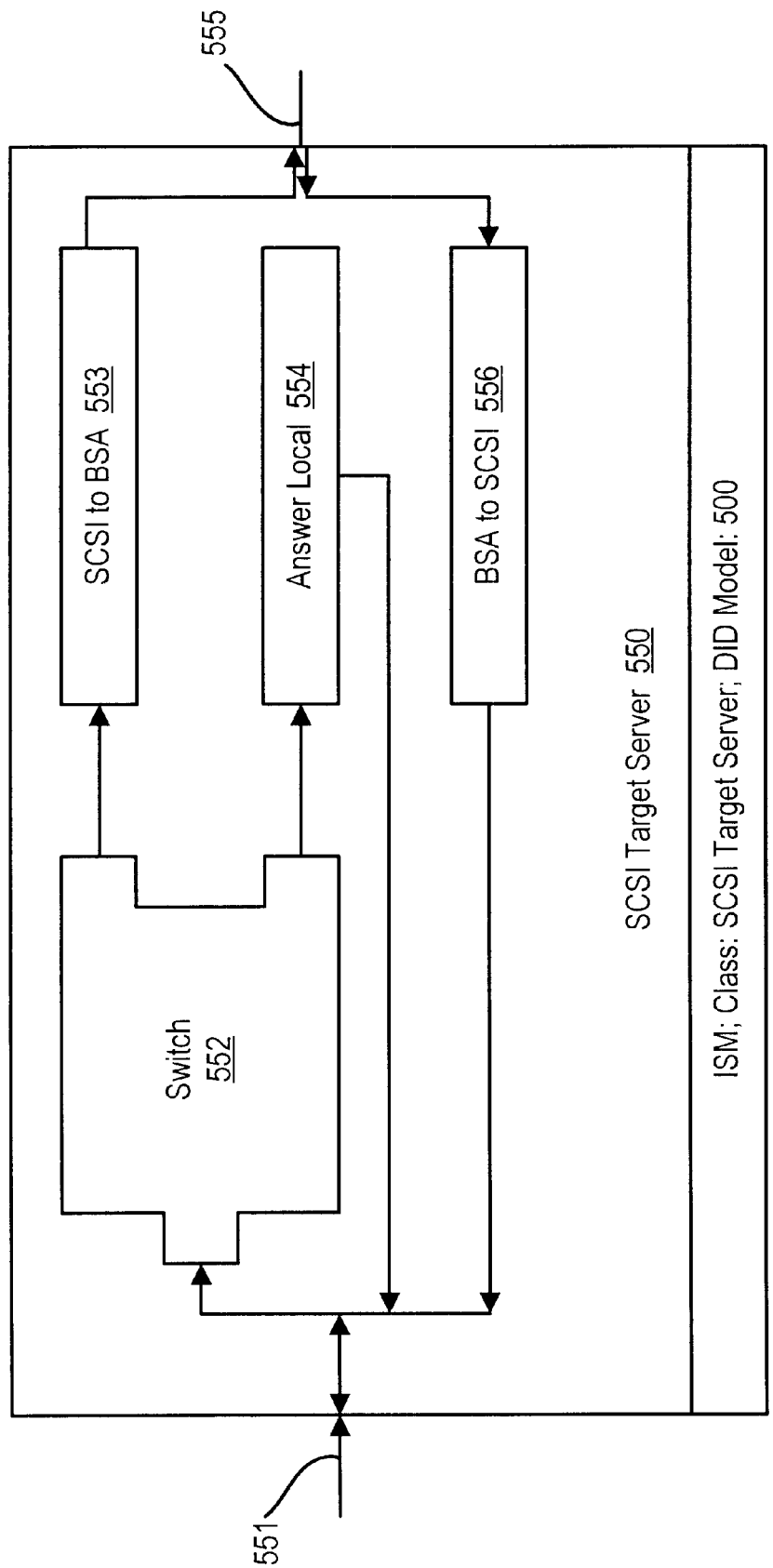
FIG. 8 is a simplified diagram of a target server internal service module according to the present invention, having a local answer capability.

FIG. 8 shows a SCSI target server 550, which is one example of a protocol server module according to the present invention. Similar protocol server modules can be implemented for any particular storage channel or network protocol implemented by users of the data managed through the storage server of the present invention. The target server 550 has a message interface 551 which receives incoming messages from an HDM, such as the HDM of FIG. 5, coupled to a communication interface adapted for connection with a user. In this example, the messages on interface 551 have an SCSI format. In other examples, the messages may already have the BSA architecture, or some other architecture which is suitable for the protocol on the communication interface being served. The server 550 includes a switch function 550 which translates incoming messages to a SCSI to BSA translator 553, or to an answer local function 554. Typically messages are forwarded by the translator 553 as outgoing messages on line 555. Incoming messages on line 555 are supplied to translator 556 which translates the incoming BSA messages to the SCSI format used on line 551.

In many instances, the SCSI target device can respond using the local answer service 554 to the SCSI message without routing the message further. Many status messages that do not relate to reading or writing from the storage itself are handled by the local answer service 554.

The target server 550 in this example is an instance of a class SCSI target server, and given a device identifier 500. One function of the protocol server, such as the SCSI target server 550, is to identify the storage extent which is subject of a storage transaction on the associated interface. The storage extent is mapped to a virtual circuit using the configurable logic in the storage server as described in more detail below.

Figure 9:
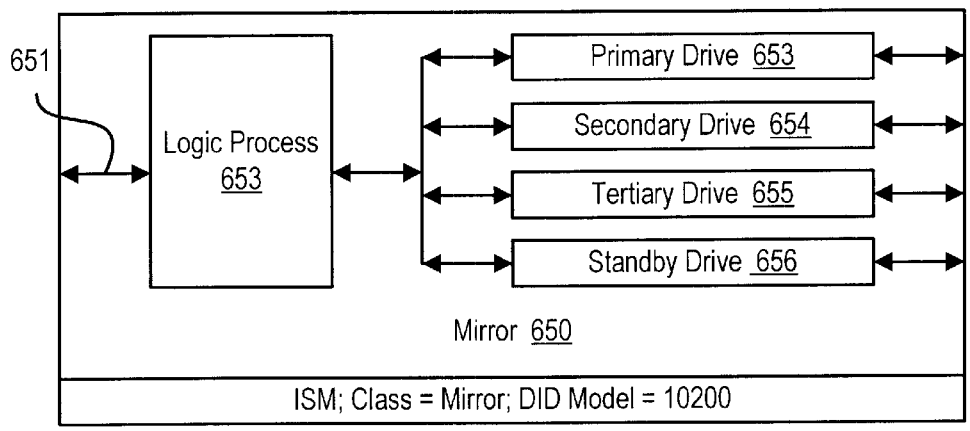
FIG. 9 is a diagram of a internal service module implementing a disk mirror.

FIG. 9 illustrates an ISM 650 which performs a mirror management data path task. The ISM 650 includes an interface 651 which is connected to the internal communication channels on the device. Logic processes 652 receive the incoming communications and data and manage a mirroring function. The logic 652 communicates with a plurality of drive interfaces including primary drive 653, secondary drive 654, tertiary drive 655, and standby drive 656. Although 3-way mirroring is shown in the diagram, any number of mirror paths may be implemented for "n-way" mirrors using virtual circuits. Although the drive interfaces in FIG. 9 are labeled with the term "drive," other types of storage devices can be used in the mirroring functions. The drive interfaces 653–656 communicate using the internal communication channels with the HDM modules associated with the target storage devices used in the mirroring function, or with other ISM modules as suits the particular virtual circuit. In this example, the mirror ISM 650 is implemented as an instance of a class "mirror," and given a device identifier 10200.

Figure 10:
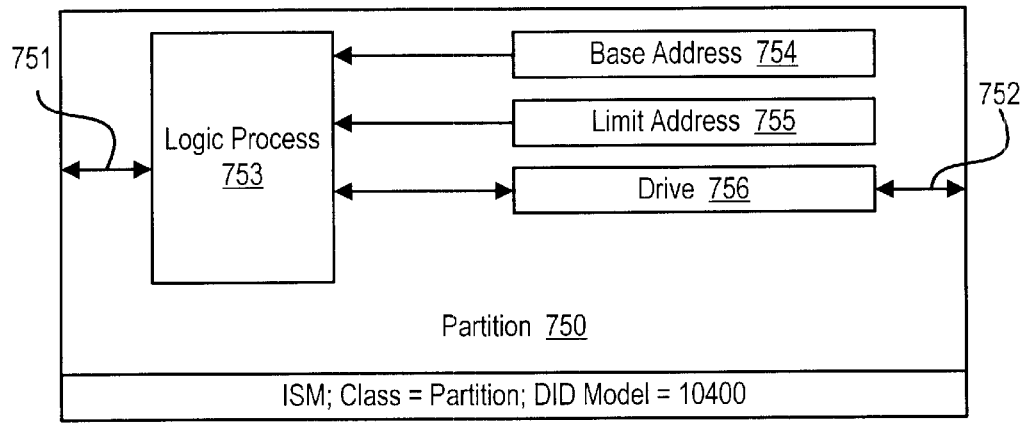
FIG. 10 is a diagram of an internal service module implementing a partition function.

FIG. 10 illustrates a partition ISM 750. The partition ISM 750 includes an interface 751 which receives internal communications from other driver modules, and an interface 752 which also communicates with other driver modules. The ISM 750 includes logic processes 753, data structures for storing a base address 754 and a limit address 755, and a drive interface 756. The partition logic process 753 configures the subject storage device identified by the drive process 756, using a logical partitioning function useful for a variety of storage management techniques, so that the physical device appears as more than one logical device in the virtual circuits. In this example, the partition ISM 750 is an instance of a class "partition," and given device identifier 10400.

Figure 11:
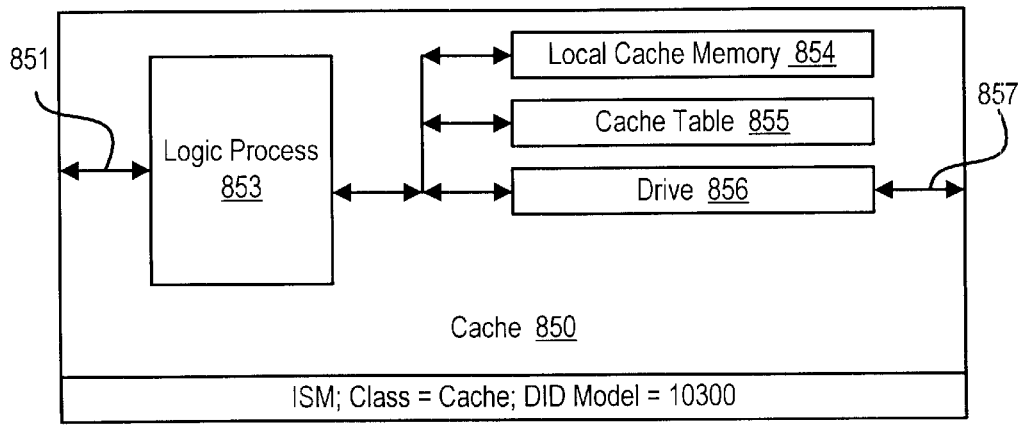
FIG. 11 is a diagram of an internal service module implementing a cache function.
Figure 12:
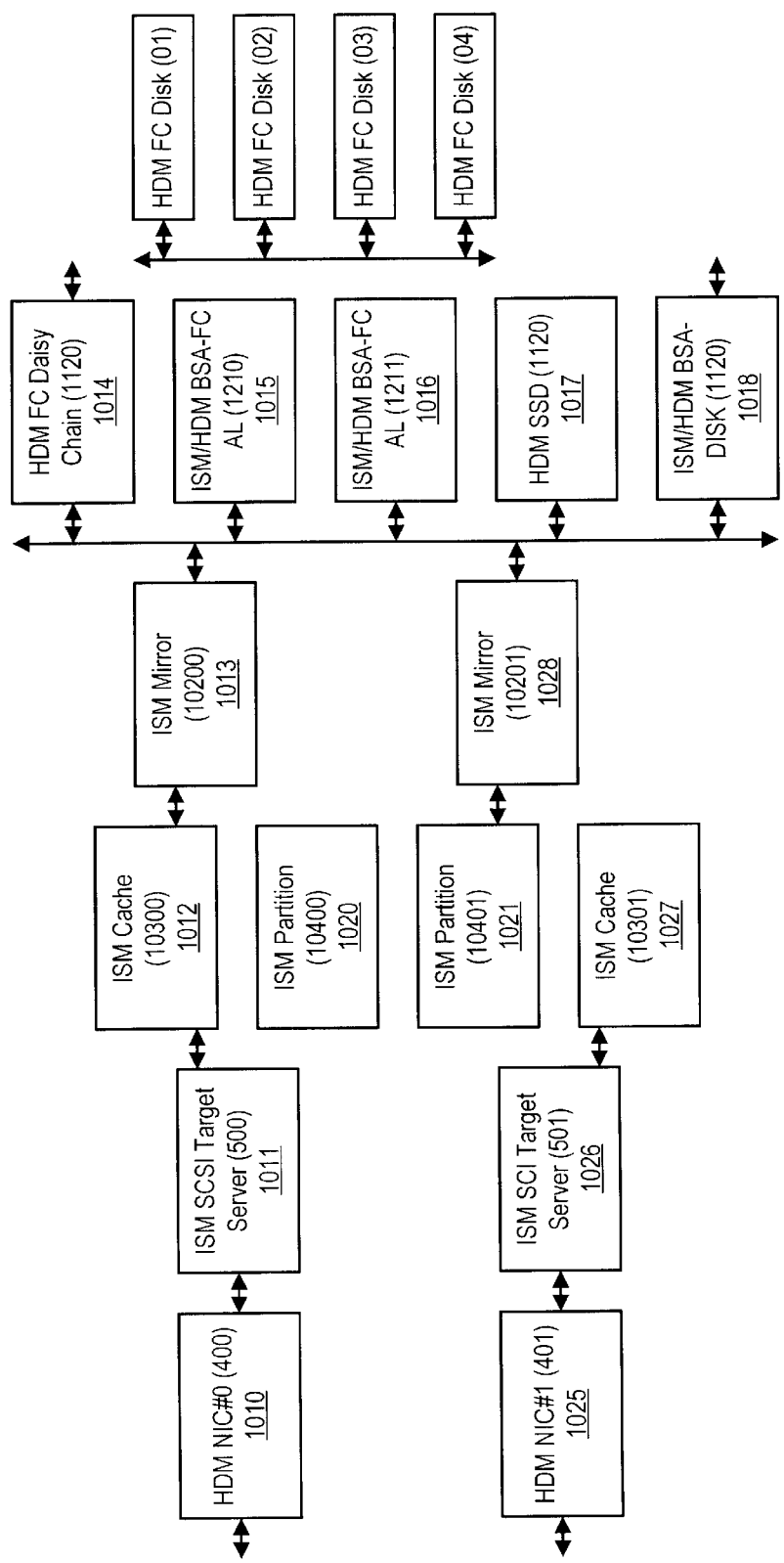
FIG. 12 illustrates a virtual circuit configuration according to the present invention.

FIG. 11 illustrates a cache ISM 850. The cache ISM 850 includes logic processes 853 which communicate with an interface 851 to the internal message passing structure on the storage server. Data structures in the cache ISM 850 include a local cache memory allocation 854, a cache table 855 which identifies the data stored in the cache 854, and a drive interface 856. The drive interface communicates on channel 857 with an HDM associated with the particular virtual circuit being served by the cache. The cache memory 854 in one embodiment is managed locally in the storage server. In an alternative embodiment, the cache can be stored in a high speed non-volatile memory, such as a solid state memory module having architecture like that described with respect to FIG. 6. In the preferred embodiment, the cache ISM 850 is implemented as an instance of a class "cache," and given a device identifier 10300.

FIG. 12 provides a heuristic diagram of redundant virtual circuits implemented by data paths including a plurality of driver modules according to present invention. Virtual circuits include an external interface for communication with a user of the data, a protocol translator for translating communications with the user into the communication format of the driver modules, and a storage object which includes a communication interface to a storage device. Storage operators which perform data path tasks can exist between the translator and the storage object. The optimal ordering of the driver modules acting as storage operators, such as cache, mirror, partition, etc., is done by the system designer using the configurable logic provided by the storage server.

In the example illustrated in FIG. 12, the external interface is provided by the NIC #0, and its associated HDM is represented by block 1010. The protocol translator is provided by the SCSI target server ISM 1011. A cache function is provided by the ISM 1012. A mirror function is provided by the ISM 1013. The storage objects are accessed from the mirror function 1013, and consist of a set of physical storage interfaces selected in this example from the fiber channel basic daisy chain interface and its associated HDM represented by block 1014 or an external LUN interface, the disk drives in the fiber channel arbitrated loop accessed through the ISM/HDM pair represented by block 1015 and the redundant block 1016, the solid state storage device and its associated HDM represented by block 1017, and the interface to an external disk drive and its associated ISM/HDM pair represented by block 1018. Separate HDM modules on each of the fiber channels interfaces to disks (01), (02), (03), and (04) manage the communication across the fiber channel arbitrated loops with the interfaces 1015 and 1016.

In the embodiment shown, the mirror module 1013 accesses disks (01), (02), and (04) as the primary, secondary and standby drives, respectively, for the mirror functions. Although the mirror module shown in FIG. 9 includes the tertiary drive interface, this tertiary drive is not used in the example system.

Also shown in the diagram are partition ISM modules 1020 and 1021, which are not connected with the data paths of the virtual circuit shown. These blocks are present to illustrate that using the virtual circuit structure, new modules, like partitioning, may be added to the path by simply configuring the storage server.

A redundant data path is implemented using the interface NIC #1 and its associated HDM represented by block 1025, the SCSI target server ISM represented by block 1026, the cache ISM represented by block 1027, and the mirror ISM represented by block 1028. Redundancy in the data storage devices is accomplished using the mirror function. The redundant driver modules are distributed in a preferred embodiment on separate IOPs within the storage server.

Figure 13:
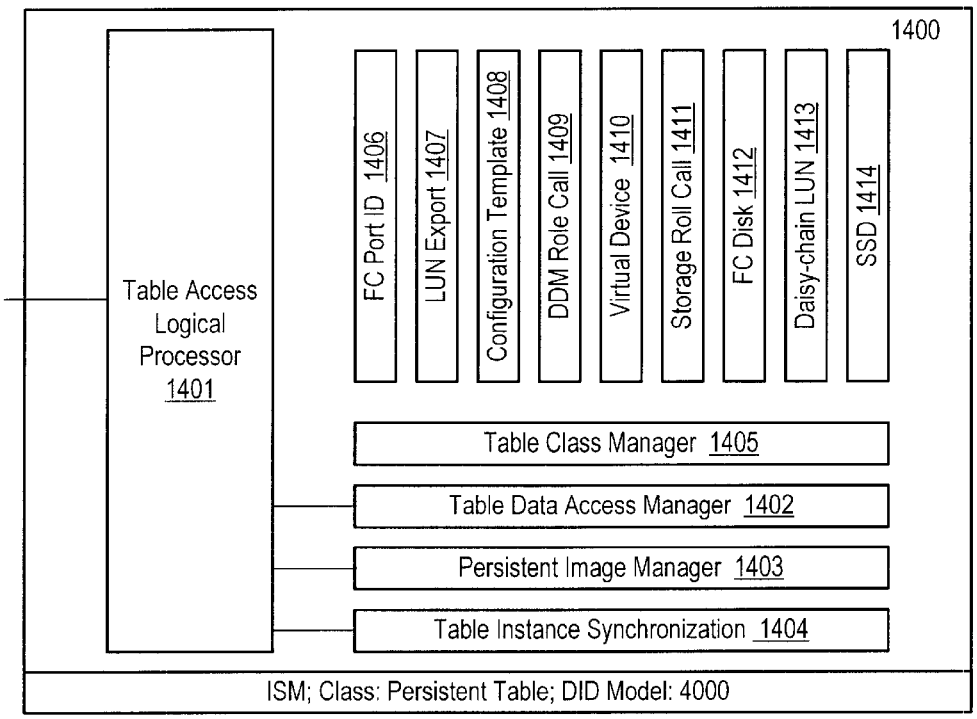
FIG. 13 is a diagram of a the internal service module implementing a persistent table store manager according to the present invention.

As illustrated in FIG. 12, each of the driver modules includes a unique driver identifier which is shown within the parentheses in the blocks of FIG. 13. The unique device identifiers are used to support the configuration logic based on tables in a configuration database managed by the storage server, and controlled by local configurable logic in the storage server.

Figure 14:
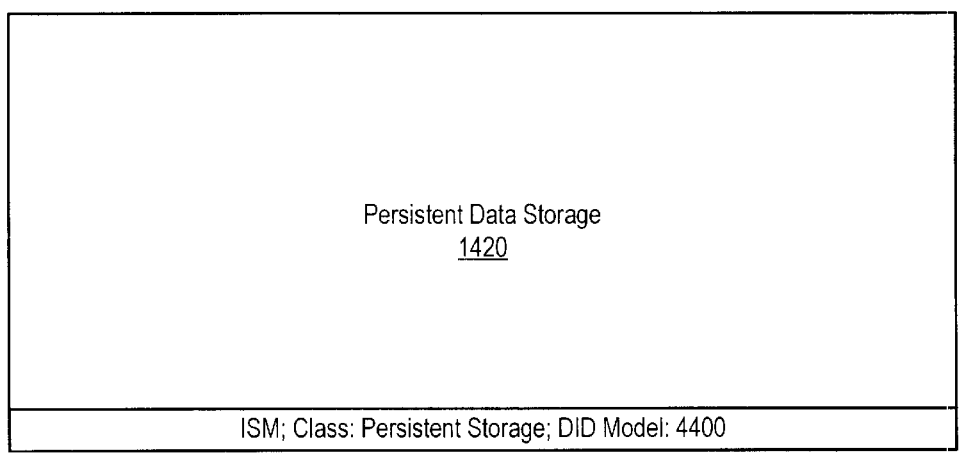
FIG. 14 illustrates schematically a persistent storage hardware driver module according to the present invention.

In the preferred system, the configuration tables are managed by a persistent table driver, such as that illustrated in FIGS. 13 and 14. Referring back to FIG. 2, the ISAN server 102A stores management and routing information in tables such as the tables 116. The tables 116 can be accessed through the management interface 120. The tables 116 will typically be stored in persistent memory such as a non-volatile memory. The tables 116 can be maintained redundantly to provide fail safe support.

FIG. 13 illustrates a persistent table module 1400 which is implemented as an instance of a class "persistent table," following the basic architecture of the driver module structure. The persistent table module 1400 includes a table access logical processor 1401, and a variety of supporting functions including table data access manager 1402, persistent image manager 1403, and persistent table instance synchronization module 1404. The table data access manager 1402 is coupled with a table class manager 1405 in this embodiment. The table class manager manages a plurality of configuration tables including a fiber channel port ID table 1406, a LUN export table 1407, a configuration template table 1408, a DDM roll call table 1409, a virtual device table 1410, a storage roll call table 1411, a fiber channel disk roll call table 1412, an external LUN table 1413 and a solid state storage table 1414. The particular configuration of the set of tables managed by the persistent table module 1400 can be changed to suit the particular implementation, and optimized for certain classes of devices.

Figure 15:
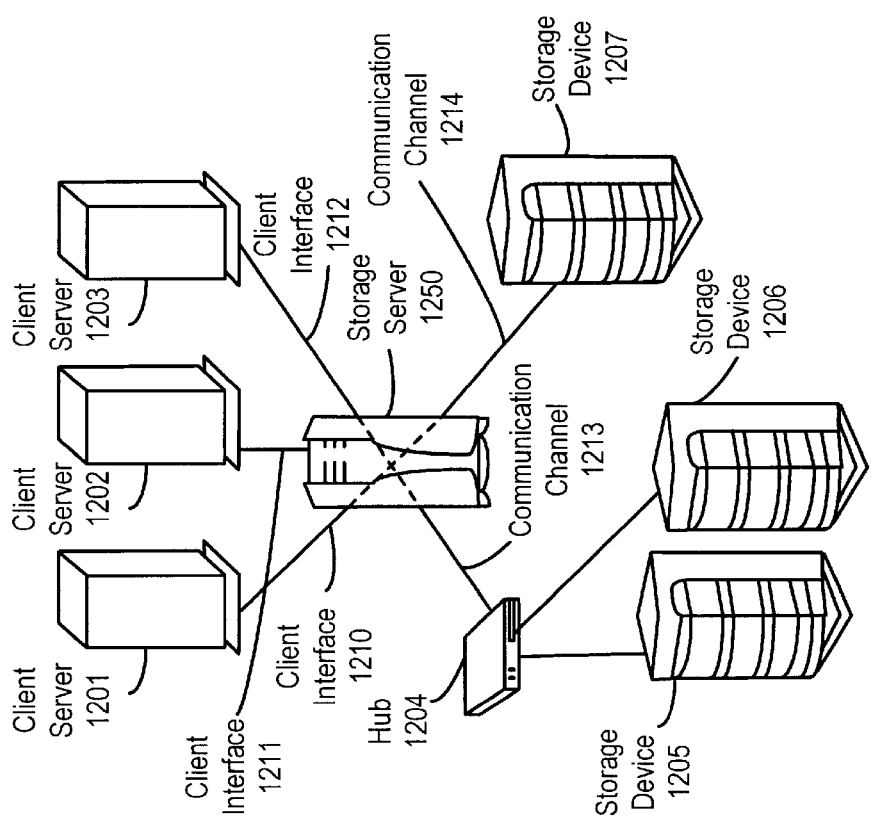
FIG. 15 illustrates a storage area network having a storage server according to the present invention configured as a storage router or a storage director.

The persistent image manager 1403 and the table instance synchronization manager 1404 communicate with persistent data storage driver 1420 as illustrated in FIG. 15, and a second persistent storage driver not shown. The persistent data storage driver 1420 is implemented as an HDM, which is an instance of a class "persistent storage," and is given a device identifier following the model of the driver modules described above. In the preferred system, the persistent data storage HDM 1420 communicates with the solid state storage device in the storage server, and provides fast access to the data used in the virtual circuits.

The persistent data storage maintains a wide variety configuration information for the system. The DDM roll call table 1409 includes a list of all the instances of the device driver modules, and their unique device IDs. The storage roll call table 1411 includes a list of all the active storage devices detected by the storage server. The roll call tables can be utilized by the virtual device table 1410 and by the configuration tools to create virtual circuits. The LUN export table 1407 provides a technique for mapping the identified storage extents within a storage channel transaction to virtual circuits. The external LUN table 1413 identifies logical units of storage which are maintained in other storage servers connected through the external storage interface on the storage server.

Two primary tables support the exporting of storage to clients and the storage routing functionality of the ISAN server 102A. These tables are the export table 1407 and the virtual device configuration table 1410.

The Export Table 1407

The export table 1407 maps addressing information received with a storage transaction to a virtual circuit or to a storage option. In the case of SCSI-3 over a fibre channel interface, the addressing information used is the initiator ID, the target LUN, and the target address.

It is not necessary to use all of this information to resolve each request because many LUNs can be shared across all initiators, or clients, and most LUNs will use the target address, e.g., the offset on the storage device, for addressing within the virtual circuit rather than for selecting different virtual circuits. Thus in a typical embodiment, the export table 1407 is organized as shown in Table 1.

TABLE 1

| Protocol | Protocol Specific Addressing (LUN) | Initiator Specific? if yes, ID | First virtual device in circuit | Primary connection owner |
|---|---|---|---|---|
| SCSI | 0 | No | 11 | NIC 0 |
| SCSI | 1 | Yes, ID = 6 | 30 | NIC 0 |
| SCSI | 1 | Yes, ID = 5 | 60 | NIC 1 |
| SCSI | 2 | No | 12 | NIC 0 |
| TCP/IP | Port 2000 | No | 70 | NIC 0 |

The export table 1407 may include other columns such as the current state of the virtual circuit, the capacity of the virtual circuit, and other information. In one embodiment, the export table 1407 lists the entire virtual circuit in a column of the export table.

Table 1 shows that protocol specific addressing information can be used to route the request to the appropriate virtual circuit. Therefore, only TCP sessions using port 2000 as the identifier of the target extent of storage would be routed to the virtual circuit starting with the virtual device having identifier 70.

Table 1 shows that a single LUN for a protocol can be connected to different devices depending on the initiator of the storage transaction. In this example, LUN 1 is mapped to different virtual circuits based on the initiator ID. Also, virtual circuits can be mapped based on other types of identifiers, such as the World Wide Name WWN.

An example export table has the following structure:

define EXPORT_TABLE "Export_Table"

```
struct ExportTable Entry {
    rowID        ridThisRow;       //rowID of this table row.
    U32          version;          //Version of Export Table
                                   record.
    U32          size;             //Size of Export Table
                                   record in bytes.
    CTProtocolType ProtocolType;   //FCP, IP, other
    U32          CircuitNumber;    //LUN or other
    VDN          vdNext;           //First Virtual Device
                                   number in the Path
```

-continued

| | | |
|---|---|---|
| VDN | vdLegacyBsa; | //Virtual Device number of the legacy BSA |
| VDN | vdLegacyScsi; | //Virtual Device number of the legacy SCSI |
| U32 | ExportedLUN; | //LUN number exported |
| U32 | InitiatorId; | //Host ID |
| U32 | TargetId | //ourID |
| U32 | FCInstance; | //FC Loop number |
| String32 | SerialNumber; | //Use a string array for Serial Number |
| long long | Capacity; | //Capacity of this Virtual Circuit |
| U32 | FailState; | |
| U32 | PrimaryFCTargetOwner; | |
| U32 | SecondaryFCTargetOwner; | |
| CTReadyState | ReadyState; | //Current state |
| CTReadyState | DesiredReadyState; | //Desired Ready State |
| String16 | WWNName; | //World wide Name (64 or 128-bit IEEE registered) |
| String32 #endif | Name; | //Virtual Circuit Name |

The Virtual Device Configuration Table

The virtual device configuration table connects virtual devices with the device drivers that support the virtual device. The virtual devices are designed to support a redundant design. Therefore the table for virtual device configurations maps virtual device numbers to device modules. In one embodiment, a table such as Table 2 is used to map virtual devices to supporting device drivers. FIG. 12 illustrates the virtual circuit implemented by Table 2, starting with virtual device 12.

TABLE 2

| Virtual Device | Primary | Alternates | Parameters | Status | Class |
|---|---|---|---|---|---|
| 1 | 4000 | 4001 | N/A | Primary | Persistent Table |
| 10 | 1210 | 1211 | SO(00) | Alternate | FC Disk |
| 11 | 500 | 501 | VD(10) | Primary | SCSI Target |
| 12 | 500 | 501 | VD(13) | Primary | SCSI Target |
| 13 | 10300 | 10301 | VD(14) | Primary | Cache |
| 14 | 10200 | 10201 | VD(15,16, null,17) | Primary | Mirror |
| 15 | 1210 | 1211 | SO(02) | Primary | FC Disk |
| 16 | 1210 | 1211 | SO(03) | Primary | FC Disk |
| 17 | 1210 | 1211 | SO(04) | Primary | FC Disk |

As Table 2 shows, for each virtual device, information is provided about primary and alternate driver modules supporting the virtual device. For example, in the second entry in Table 2, a fibre channel disk drive is mapped to virtual device (VD) 10.

The virtual device comprises the one or more software or hardware modules for supporting the virtual device. The parameters column is used to provide initialization information. In the case of VD 10, the parameter is SO(00) which stands for storage option 0. Each device driver module class has class specific parameters. Storage option drivers use parameters specifying a particular storage unit. Intermediate driver classes such as the mirror driver and the cache driver use parameters that specify the next virtual devices in the virtual circuit. This format allows a single device driver module to support multiple devices based on the parameter setting. Notice that in Table 2, the device driver 1210 is being used by virtual devices 10, 15, 16, and 17, but each specifies a different parameter to the driver.

The status column indicates the status of the software or hardware modules supporting the virtual device. For example, in the first entry in Table 2, the status is "primary", which means that the primary device driver, 4000 here, is being used. In the second entry in Table 2, the status is "alternate", which means that the primary device driver has failed or is not responding properly. In that case, the alternate driver, 1211 for the second entry in Table 2, is used. If a device has more than one alternate, the status column will indicate the driver being used.

Example

For example, consider a storage transaction that comes over one of the connection options 130 to the ISAN server 102A using the SCSI protocol and designating LUN 2 in the addressing information. Assume that the ISAN server 102A is configured as shown in Tables 1 and 2 for this example.

The connection option such as the network interface 146 over which the storage transaction is received is coupled to a hardware device driver. The hardware device driver receives the storage transaction and depending on the protocol, dispatches it to an appropriate virtual device for handling that protocol.

For example, SCSI storage transactions are sent to a device driver in the SCSI target class. Similarly, IP storage transactions are sent to a device driver in the IP target class. Here, the storage transaction was made using the SCSI communication protocol so it is routed to a SCSI target device driver (DID 500).

The SCSI target device driver further analyzes the request. The first part of the analysis is to determine which virtual circuit to map the request to. This determination can be made using the information in the export table. In this example, Table 1, indicates that a request using the SCSI protocol specifying LUN 2 should be routed to the virtual circuit starting with the virtual device 12. In one embodiment, all of the SCSI target requests are routed to the same SCSI target driver for a single interface. In this embodiment, the parameter information for the target VD 12 is used to control the behavior of the SCSI target device rather than routing the message to a second virtual device for a SCSI target.

The SCSI target device here, driver number 500, translates the SCSI message into an internal format. One such format is based on the I₂O block storage architecture (BSA) format. This format is device and protocol neutral and can be used by the intermediate device drivers. Once the request is in internal format, it is sent to the next virtual device in the virtual circuit as indicated by the parameter field, here, the parameter is VD(13) or virtual device 13.

The message is routed to the VD 13, which provides redundant caching drivers, here, the drivers numbered 10300 and 10301. The caching driver uses a memory to cache storage transactions. Based on the caching algorithm being used by the driver, the driver will route storage transactions to the next virtual device in the virtual circuit at appropriate intervals. Here that next device is indicated by the parameter VD(14), or virtual device 14.

In the internal format, the message is routed to VD 14. The virtual device 14 includes redundant mirroring drivers. In this case, the drivers 10200 and 10201 are used. The mirroring drivers implement a mirroring algorithm for maintaining a mirrored image of storage on multiple volumes. This mirroring driver supports a primary, secondary and tertiary store as well as a standby store. Other mirroring drivers may support different algorithms. This mirroring driver also supports the coupling of a new store that is steadily brought into synchronicity with an existing store. Based on the mirroring algorithm being used by the driver and the status of the mirrored stores, the driver will route storage transactions to the appropriate virtual devices in the virtual circuit. Assuming that both the primary and alternate stores are functioning, the mirror driver will route this request to the primary and secondary stores only according to the parameter VD(15, 16, null, 17) or virtual devices 15 and 16. The null in the parameter list indicates that no tertiary drive is currently being used for this virtual device.

The mirroring driver may route the storage transaction messages in serial or in parallel to the two devices. In this example, the messaging to virtual device 15 will be considered although the example can also be extended to the second store, virtual device 16. Virtual device 15 includes redundant drivers for controlling a fibre channel drive. The drivers translate the internal format into a format used by the drives, e.g., BSA to SCSI. The drivers also provide the addressing information to the drive. Here, the parameter SO(02) is used to select a storage option, here the fibre channel drive number 2.

Accordingly, within the storage platform, hardware functions (such as disk or flash storage) and software functions (such as RAID stripes or Mirrors) are all accessed via software drivers most commonly referred to as devices.

These devices are paired up (with each member of the pair preferably running a separate board for redundancy) and called Virtual Devices. These Virtual Devices are then chained together into various configurations. For instance, a mirror device can be chained to two or three disk devices. Through this type of configuration Virtual Device chains are constructed. These Virtual Device chains can be added to as long as they are being configured into some BSA-type device that can itself be used within yet another configuration.

Virtual Device chains are connected to a FCP/SCSI Target Server device and mapped in the FCP Target Driver's LUN export tables for "export" (i.e., to be accessible via the FCP protocol from the outside world). At that point the Virtual Device chain with a SCSI Target Server Device at its head is called a Virtual Circuit.

The Virtual Circuit Manager software responsible for creating Virtual Circuits puts the SCSI Target Server "head" onto a Virtual Device chain and then exports the Virtual Circuit by updating the FCP Target's Export Tables. The software also supports delete, quiesce and fail-over operations.

Virtual Circuit Manager software is also responsible for maintaining the Virtual Circuit Tables VCTs that list in a single place all the Virtual Devices in each Virtual Circuit. This information is needed to implementing many system actions such as failover, hot-swap and shutdown.

When it is initialized, the Virtual Circuit Manager software defines the VCT itself in the persistent table store. Note that this is harmless if the VCT has already been defined. The Virtual Circuit Manager software also listens for insertions, deletions and any modifications to the VCT.

In order to create a new Virtual Circuit, the information necessary to instantiate a SCSI Target Server and to map and export the new LUN must be placed into a record in the VCT. The Virtual Circuit Manager listens for insertions into the VCT and upon receiving a listen reply will perform the following actions:

1. Attempt to validate the information in the newly inserted record. If the record contains invalid information, its status field is set to indicate the error and no further action is taken.
2. Create a new SCSI Target Server device for the LUN of the Virtual Circuit specified by the newly inserted record.
3. Set the status in the new record to "Instantiated".
4. The storage assigned to the Virtual Circuit will be flagged as used in a Storage Roll Call Table.
5. The Export Table will be updated to dispatch the LUN to the new SCSI Target Server.

When a record in the Virtual Circuit is deleted, the Virtual Circuit Manager will perform the following actions:

1. Quiesce the Virtual Circuit if it isn't already and mark it as Quiesced.
2. Remove the Virtual Circuit's dispatch data from the Export Table.
3. Mark the Roll Call Record referenced from the Virtual Circuit Record as unused.
4. DeInstantiate the SCSI Target server associated with the Virtual Circuit.

The Virtual Circuit Manager also listens for modifications to the "Exported" field in the VCT. If the "Exported" field in any record in the VCT is set to True, then the Virtual Circuit Manager will perform the following actions;

1. Export the virtual circuit by making the necessary modifications to the FCP Target's Export Table.
2. If there is any error encountered during the Export Operation, the status field in the VC Record will be set and the "Exported" field will be left in a correct state. If the Virtual Circuit was not exported, the Exported Flag will be set to False.

The Virtual Circuit Manager listens for modifications to the "Quiesced" field in the Virtual Circuit Table. If the "Quiesced" field in any record in the VCT is set to True, then the Virtual Circuit Manager will perform the following actions:

1. If the VC is currently exported, it will be unexported and its "Exported" flag will be set to False.
2. All of the Virtual Devices in the Virtual Circuit will be sent Quiesce Messages.
3. If there is any error encountered during the Quiesce Operation, the status field in the VC record will be set and the "Quiesced" field will be left in a correct state, i.e., if the Virtual Circuit was not quiesced, the Quiesced Flag will be set to False.

FIG. 15 illustrates a storage area network utilizing a storage server 1200 according to the present invention. The storage server 1200 in the network has client interfaces 1210, 1211, 1212 coupled to client servers 1201, 1202, and 1203 respectively. Storage interfaces 1213 and 1214 are coupled to communication channels to storage devices 1205, 1206, 1207. The communication channel 1213 in this example is connected through a hub 1204 to the devices 1205 and 1206. In operation, the client interfaces operate according to protocol by which the client servers requests storage transactions by commands which carry an identifier of an initiator, a logical extent such as a LUN number, and an identifier of a target device. The storage server 1200 maps in the requested transaction to a virtual device, which in turn allocates physical storage for use in the transaction from among the physical storage devices. The storage server 1200 also includes resources that emulate the target physical device identified in the request. The storage server 1200 is able to direct storage transactions using local configuration data, and simplify the management of storage for the client servers.

Figure 16:
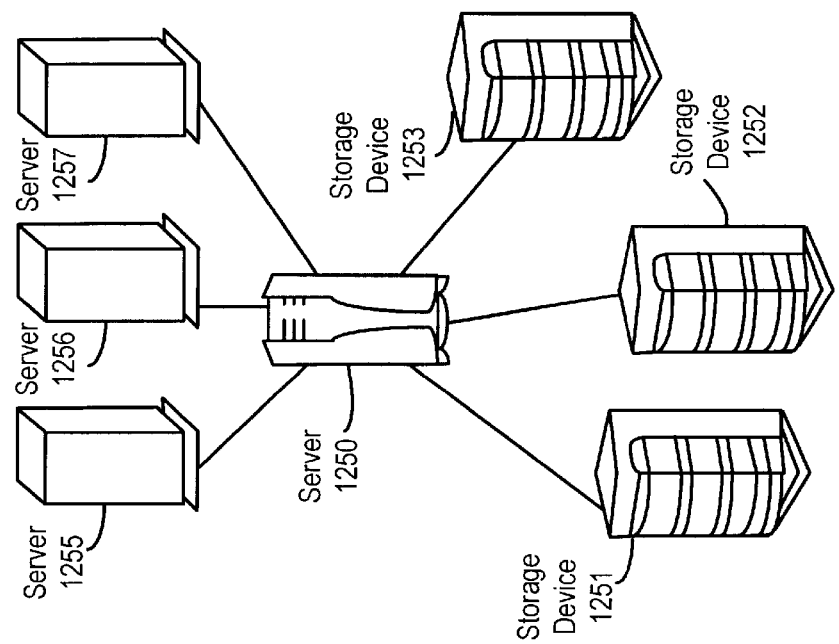
FIG. 16 illustrates a storage area network in an alternative configuration having a storage server according to present mention configured as a storage router or a storage director in a heterogeneous network.

FIG. 16 illustrates another embodiment of a storage area network. In FIG. 18, a server 1250 which includes storage director logic and cache memory as discussed above, is coupled to client servers on a variety of different platforms, including a Hewlett-Packard server 1255, a Sun server 1256, and a SGI server 1257, each of which may be executing different protocols management of storage transactions. A plurality of physical storage devices is also coupled to the server 1250 and managed by the storage director according to the virtual device architecture described above. The plurality of physical storage devices in this example include storage on a Hewlett-Packard platform 1251, storage on a Sun platform 1252 and a storage upon a EMC platform 1253. Thus, the server, including storage director logic, allows creation of a shared storage pool that can support legacy servers and storage in a heterogeneous environment. Incompatibilities among the plural storage devices and servers can be masked or mimicked as needed using the virtual device architecture. True storage area network environments can be implemented and all host, fabric and storage interoperability issues can be managed at the storage server level.

The storage director logic utilizing the virtual device architecture provides a single intelligent coordination point for the configuration of server access to storage. Little or no hardware re-configuration is necessary in adding new devices or changing management of existing devices. The configuration of the storage server provides accurate configuration information and control by allowing automatic maintenance of the mapping of data sets in physical storage to servers. Maintaining accurate map of physical storage simplifies management of storage area network significantly. Also, the storage director at the server provides for active migration of data from old storage devices to new storage devices while the devices remain online. In addition, storage objects are no longer limited in size by the size of the largest object that can be created in an array. Multiple arrays can be concatenated into a single storage object independent of host operating systems running on client servers. The storage director can also manage backup and testing operations such as making snapshots of data in the non-volatile cache, and for managing data backup by copying data from disk to tape, for example, without being routed through the client server. Furthermore, the local cache can be used to migrate data from arrays that have lost redundancy and to repair redundant storage and maintain full availability of data while an array is being repaired or rebuilt. For applications having multiple servers accessing a common data set, locking logic can be placed in the storage server in a manner which provides a simple scalable solution using the virtual device architecture.

The storage director logic in the storage server operates to consolidate caching requirements from both servers and storage to reduce the total amount of cache memory required for a storage area network. The system is able to allocate more cache to either the server the client server or storage system than either can effectively provide as internal memory. Further, the cache can be dynamically or statically allocated as defined for the applications using the system.

Figure 17:
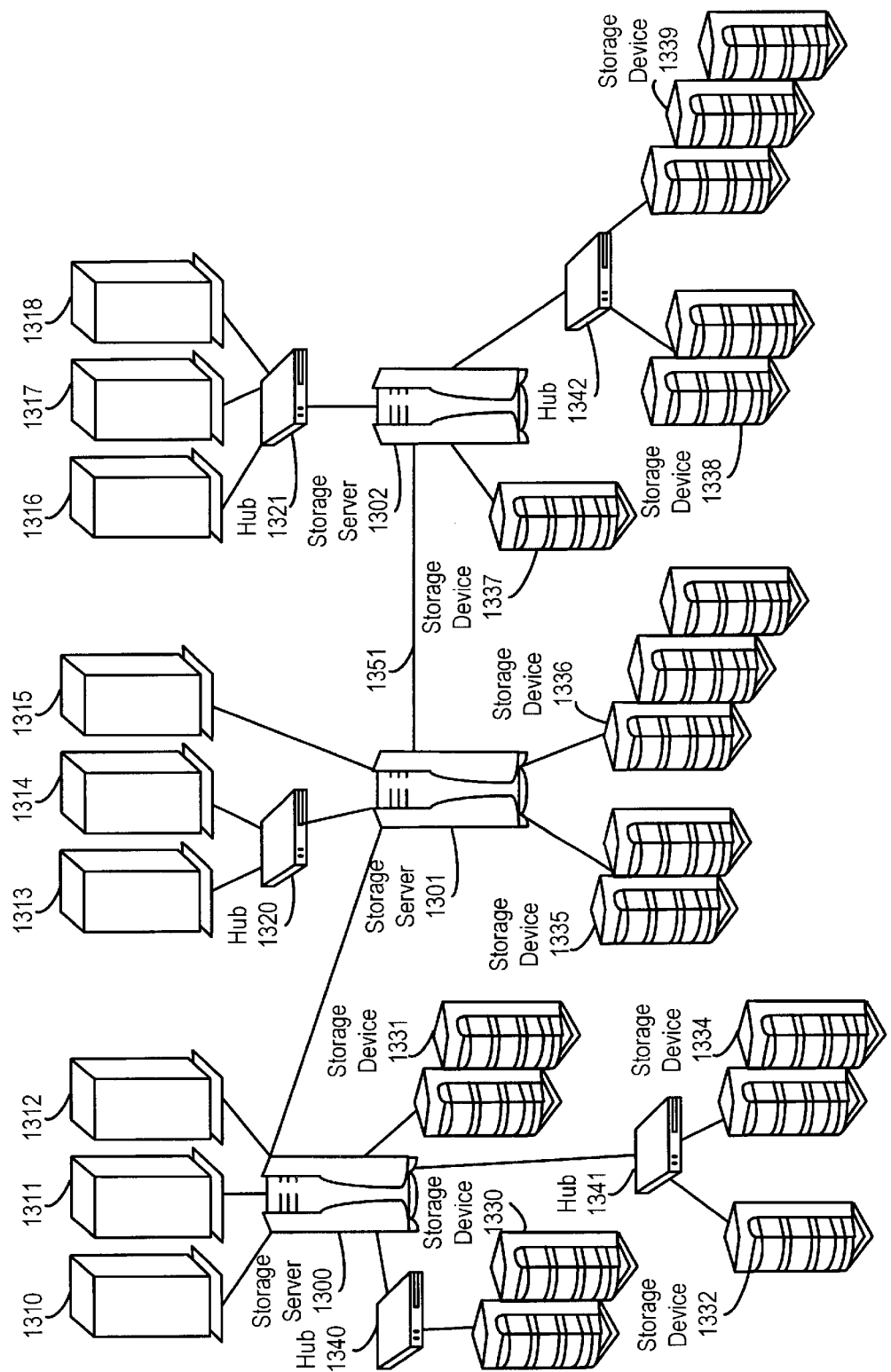
FIG. 17 illustrates a more complex storage area network including several storage servers according to the present invention with direct communication channels between them.

FIG. 17 illustrates a more rigorous example of a storage area network using a plurality of interconnected storage servers according to the present invention. Storage servers 1300, 1301, and 1302 are included, interconnected by communication channels 350, 351 using for example, a high speed protocol such as fiber channel, Gigabit ethernet, or ATM. Each storage server includes storage director logic and non-volatile cache in the preferred embodiment. The storage servers 1300, 1301, and 1302 are coupled to a plurality of client servers 1310 through 1318 in this example. The client servers 1313 and 1314 are connected through a hub 1320 to the storage server 1301. Likewise, the client servers 1316 through 1318 are connected to a hub 1321 which in turn is connected to the storage server 1302. The client servers 1310–1318 communicate with the storage server using storage channel protocols such as FCP described in detail above. According to these protocols, storage transactions are requested, and carry an identifier of the initiator of the request, a logical unit number LUN, and an identifier of the target storage device. These parameters are used by the storage director logic to map the storage transaction to a virtual device. The servers also include resources to emulate the target storage device so that the client servers smoothly interoperate with the plurality of storage devices in the storage area network.

In FIG. 17, there are a plurality of storage devices 1330 through 1339 illustrated coupled to the storage servers 1300–1302. In the diagram, a variety of symbols are used to represent the storage devices, and to indicate that the network is heterogeneous and can utilize a wide variety of devices managed by the virtual device interfaces at the servers 1301 through 1302. Also, the communication channels can be varied. Thus, hubs 1340, 1341 and 1342 are included in the network to facilitate a variety of communication protocols between the storage devices and the storage servers.

Conclusion

An intelligent storage area network (ISAN) server architecture has been described. The ISAN server architecture supports easy administration, uses standard components, provides an operating system, supports virtual devices, and provides high speed solid state drive systems.

The foregoing description of various embodiments of the invention have been presented for purposes of illustration and description. The description is not intended to limit the invention to the precise forms disclosed. Many modifications and equivalent arrangements will be apparent to people skilled in the art.

What is claimed is:

1. A storage server comprising:

a plurality of communication interfaces; and data processing resources coupled with the plurality of communication interfaces which transfer data among the plurality of communication interfaces, the data processing resources including a plurality of driver modules, and configurable logic linking driver modules in the plurality of driver modules into data paths, the data paths including respective sets of driver modules; wherein the configurable logic includes memory storing lists of the respective sets of driver modules, and a user interface accepting data for the lists.

2. The storage server of claim 1, wherein at least one data path comprises a plurality of driver modules each arranged to provide redundant resources for a particular function.

3. The storage server of claim 1, wherein at least one data path comprises a plurality of driver modules arranged to provide redundant resources for functions in the at least one data path.

4. The storage server of claim 1, wherein the user interface comprises a graphical user interface.

5. A storage server comprising:

a plurality of communication interfaces;

data processing resources coupled with the plurality of communication interfaces which transfer data among the plurality of communication interfaces, the data processing resources including a plurality of driver modules, and configurable logic linking driver modules in the plurality of driver modules into data paths, the data paths including respective sets of driver modules; and wherein the configurable logic includes memory storing lists of the respective sets of driver modules, and a user interface accepting data for the lists;

wherein the plurality of driver modules comprise instances of driver classes constructed in response to the configurable logic.

6. A storage server comprising:

a plurality of communication interfaces;

data processing resources coupled with the plurality of communication interfaces which transfer data among the plurality of communication interfaces, the data processing resources including a plurality of driver modules, and configurable logic linking driver modules in the plurality of driver modules into data paths, the data paths including respective sets of driver modules; and wherein the configurable logic includes memory storing lists of the respective sets of driver modules, and a user interface accepting data for the lists;

the plurality of driver modules including one or more hardware driver modules to manage respective communication interfaces, and one or more internal driver modules to perform data path tasks independently of the plurality of communication interfaces.

7. The storage server of claim 6, wherein the data path task of one or more internal driver modules includes cache memory management.

8. The storage server of claim 6, wherein the data path task of one or more internal driver modules includes mirror storage management.

9. The storage server of claim 6, wherein the data path task of one or more internal driver modules includes memory partition management.

10. The storage server of claim 6, wherein the data path task of one or more internal driver modules includes data migration management.

11. The storage server of claim 6, wherein the one or more internal driver modules includes a protocol server for a protocol supported on a communication interface in the plurality of communication interfaces.

12. The storage server of claim 6, wherein the one or more hardware driver modules includes a physical layer driver for a communication link coupled to a communication interface in the plurality of communication interfaces.

13. A storage server comprising:

a plurality of communication interfaces;

data processing resources coupled with the plurality of communication interfaces which transfer data among the plurality of communication interfaces, the data processing resources including a plurality of driver modules, and configurable logic linking driver modules in the plurality of driver modules into data paths, the data paths including respective sets of driver modules; and wherein the configurable logic includes memory storing lists of the respective sets of driver modules, and a user interface accepting data for the lists;

wherein the plurality of driver modules includes a protocol server for a protocol supported on a communication interface in the plurality of communication interfaces, the protocol server recognizing target identifiers in a session according to the protocol and linking the session to a data path in response to the target identifier.

14. The storage server of claim 13, wherein the protocol is compliant with a standard Internet Protocol (IP).

15. The storage server of claim 13, wherein the communication interface comprises an interface to a fibre channel arbitrated loop.

16. A storage server comprising:

a plurality of communication interfaces;

data processing resources coupled with the plurality of communication interfaces which transfer data among the plurality of communication interfaces, the data processing resources including a plurality of driver modules, and configurable logic linking driver modules in the plurality of driver modules into data paths, the data paths including respective sets of driver modules; and wherein the configurable logic includes memory storing lists of the respective sets of driver modules, and a user interface accepting data for the lists;

wherein driver modules in the plurality of driver modules include logic for communication of data according to an internal message format, and include logic associated with the protocol server to translate data packets according to the protocol into an internal message format.

17. The storage server of claim 16, wherein the internal message format comprises a message format supporting block transfers of 16 kilobytes or more.

18. The storage server of claim 16, wherein the communication interface comprises an interface to a fibre channel fabric.

19. The storage server of claim 16, wherein the communication interface comprises an interface to a point-to-point topology.

20. A storage server comprising:

a first plurality of communication interfaces coupled to respective host systems which execute data channel transactions;

a second plurality of communication interfaces coupled to respective data storage devices;

data processing resources coupled with the first and second pluralities of communication interfaces which transfer data among the plurality of communication interfaces, the data processing resources including a plurality of hardware driver modules to manage respective communication interfaces in the first and second plurality of communication interfaces, a plurality of internal driver modules to perform data path tasks, independent of the first plurality of communication interfaces, configurable logic linking driver modules in the plurality of hardware driver modules and the plurality of internal driver modules into data paths, the data paths including respective sets of one or more hardware driver modules and one or more internal driver modules, wherein the configurable logic includes a driver coupled to non-volatile memory to store tables identifying the respective sets of hardware driver modules and internal driver modules, and a user interface accepting data for the tables, and a protocol server module coupled with the data paths, for a protocol supported on a communication interface in the first plurality of communication interfaces, the protocol server recognizing target identifiers in a session according to the protocol and linking the session to a data path response to the target identifier.

21. A storage server comprising:

a plurality of communication interfaces;

data processing resources coupled with the plurality of communication interfaces which transfer data among the plurality of communication interfaces, the data processing resources including
- a plurality of hardware driver modules to manage respective communication interfaces in the plurality of communication interfaces,
- a plurality of internal driver modules to perform data path tasks, independently of the plurality of communication interfaces,
- configurable logic linking driver modules in the plurality of hardware driver modules and the plurality of internal driver modules into data paths, the data paths including respective sets of one or more hardware driver modules and one or more internal driver modules, and
- a protocol server module coupled with the data paths, for a protocol supported on a communication interface in the plurality of communication interfaces, the protocol server recognizing target identifiers in a session according to the protocol and linking the session to a data path in response to the target identifier.

22. The storage server of claim 21, wherein the configurable logic includes a driver coupled to non-volatile memory to store lists of the respective sets of driver modules, and a user interface accepting data for the lists.

23. The storage server of claim 21, wherein the data path task of one or more internal driver modules includes cache memory management.

24. The storage server of claim 21, wherein the data path task of one or more internal driver modules includes mirror storage management.

25. The storage server of claim 21, wherein the data path task of one or more internal driver modules includes memory partition management.

26. The storage server of claim 21, wherein the data path task of one or more internal driver modules includes data migration management.

27. The storage server of claim 21, wherein internal driver modules in the plurality of internal driver modules include logic for communication of data according to an internal message format, and include logic associated with the protocol server to translate data packets according to the protocol into an internal message format.

28. The storage server of claim 21, wherein at least one data path comprises a plurality of driver modules each arranged to provide redundant resources for a particular function.

29. The storage server of claim 21, wherein at least one data path comprises a plurality of driver modules arranged to provide redundant resources for functions in the at least one data path.

30. The storage server of claim 21, wherein the protocol is compliant with a standard Internet Protocol (IP).

31. The storage server of claim 21, wherein at least one of the communication interfaces in the plurality of communication interfaces comprises an interface to a fibre channel arbitrated loop.

32. The storage server of claim 27, wherein the internal message format comprises a message format supporting block transfers of 16 kilobytes or more.

33. The storage server of claim 22, wherein the user interface comprises a graphical user interface.

34. The storage server of claim 21, wherein the plurality of internal driver modules comprise instances of internal driver classes constructed in response to the configurable logic.

35. The storage server of claim 21, wherein the protocol server modules and the plurality of internal driver modules comprise instances of internal driver classes constructed in response to the configurable logic.

* * * * *